US012618952B2

(12) United States Patent
Wither et al.

(10) Patent No.: US 12,618,952 B2
(45) Date of Patent: May 5, 2026

(54) STAGING SYSTEM TO VERIFY ACCURACY OF A MOTION TRACKING SYSTEM

(71) Applicant: Magic Leap, Inc., Plantation, FL (US)

(72) Inventors: Jason Robert Wither, San Jose, CA (US); Eldar Khaliullin, Menlo Park, CA (US)

(73) Assignee: Magic Leap, Inc., Plantation, FL (US)

( * ) Notice: Subject to any disclaimer, the term of this patent is extended or adjusted under 35 U.S.C. 154(b) by 1424 days.

(21) Appl. No.: 17/283,908

(22) PCT Filed: Oct. 8, 2019

(86) PCT No.: PCT/US2019/055185
§ 371 (c)(1),
(2) Date: Apr. 8, 2021

(87) PCT Pub. No.: WO2020/076822
PCT Pub. Date: Apr. 16, 2020

(65) Prior Publication Data
US 2022/0011415 A1     Jan. 13, 2022

Related U.S. Application Data

(60) Provisional application No. 62/798,294, filed on Jan. 29, 2019, provisional application No. 62/745,218, filed on Oct. 12, 2018.

(51) Int. Cl.
*G01S 7/497* (2006.01)
*G01S 17/58* (2006.01)
*G01S 17/66* (2006.01)

(52) U.S. Cl.
CPC .............. *G01S 7/497* (2013.01); *G01S 17/58* (2013.01); *G01S 17/66* (2013.01)

(58) Field of Classification Search
CPC .......... G01S 7/497; G01S 17/58; G01S 17/66; G01S 7/4815; G01S 17/06; G01S 17/88; G06F 3/011
(Continued)

(56) References Cited

U.S. PATENT DOCUMENTS

| | | |
|---|---|---|
| 4,344,092 A | 8/1982 | Miller |
| 4,652,930 A | 3/1987 | Crawford |

(Continued)

FOREIGN PATENT DOCUMENTS

| | | |
|---|---|---|
| CN | 101449270 A | 6/2009 |
| CN | 104040410 A | 9/2014 |

(Continued)

OTHER PUBLICATIONS

"Communication Pursuant to Rule 164(1) EPC mailed on Feb. 23, 2022", European Patent Application No. 20753144.3, (11 pages).
(Continued)

*Primary Examiner* — Daniel L Murphy
(74) *Attorney, Agent, or Firm* — Stephen M. De Klerk

(57) ABSTRACT

A staging system has to be calibrated to determine a location of a horizontal pivot axis of a target frame. A stage calibration light beam is generated and reflected from a target frame mirror. The target frame is pivoted between first and second positions and the locations of the stage calibration light beam are detected. The locations of the stage calibration light beam provide a value representing an orientation of the target frame mirror relative to the horizontal pivot axis. The orientation of the target frame mirror is then adjusted based on the value so that the target frame mirror is more normal to the horizontal pivot axis.

17 Claims, 17 Drawing Sheets

(58) Field of Classification Search
USPC ...................................................... 356/4.01
See application file for complete search history.

(56) References Cited

U.S. PATENT DOCUMENTS

| | | | |
|---|---|---|---|
| 4,810,080 A | 3/1989 | Grendol et al. |
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,251,635 A | 10/1993 | Dumoulin et al. |
| 5,410,763 A | 5/1995 | Bolle |
| 5,455,625 A | 10/1995 | Englander |
| 5,495,286 A | 2/1996 | Adair |
| 5,497,463 A | 3/1996 | Stein et al. |
| 5,682,255 A | 10/1997 | Friesem et al. |
| 5,826,092 A | 10/1998 | Flannery |
| 5,854,872 A | 12/1998 | Tai |
| 5,864,365 A | 1/1999 | Sramek et al. |
| 5,937,202 A | 8/1999 | Crosetto |
| 6,012,811 A | 1/2000 | Chao et al. |
| 6,016,160 A | 1/2000 | Coombs et al. |
| 6,064,749 A | 5/2000 | Hirota et al. |
| 6,076,927 A | 6/2000 | Owens |
| 6,117,923 A | 9/2000 | Amagai et al. |
| 6,124,977 A | 9/2000 | Takahashi |
| 6,191,809 B1 | 2/2001 | Hori et al. |
| 6,375,369 B1 | 4/2002 | Schneider et al. |
| 6,385,735 B1 | 5/2002 | Wilson |
| 6,538,655 B1 | 3/2003 | Kubota |
| 6,541,736 B1 | 4/2003 | Huang et al. |
| 6,757,068 B2 | 6/2004 | Foxlin |
| 7,046,515 B1 | 5/2006 | Wyatt |
| 7,051,219 B2 | 5/2006 | Hwang |
| 7,076,674 B2 | 7/2006 | Cervantes |
| 7,111,290 B1 | 9/2006 | Yates, Jr. |
| 7,119,819 B1 | 10/2006 | Robertson et al. |
| 7,219,245 B1 | 5/2007 | Raghuvanshi |
| 7,431,453 B2 | 10/2008 | Hogan |
| 7,542,040 B2 | 6/2009 | Templeman |
| 7,573,640 B2 | 8/2009 | Nivon et al. |
| 7,724,980 B1 | 5/2010 | Shenzhi |
| 7,751,662 B2 | 7/2010 | Kleemann |
| 7,758,185 B2 | 7/2010 | Lewis |
| 8,060,759 B1 | 11/2011 | Arnan et al. |
| 8,120,851 B2 | 2/2012 | Iwasa |
| 8,214,660 B2 | 7/2012 | Capps, Jr. |
| 8,246,408 B2 | 8/2012 | Elliot |
| 8,353,594 B2 | 1/2013 | Lewis |
| 8,508,676 B2 | 8/2013 | Silverstein et al. |
| 8,547,638 B2 | 10/2013 | Levola |
| 8,605,764 B1 | 12/2013 | Rothaar et al. |
| 8,619,365 B2 | 12/2013 | Harris et al. |
| 8,696,113 B2 | 4/2014 | Lewis |
| 8,698,701 B2 | 4/2014 | Margulis |
| 8,733,927 B1 | 5/2014 | Lewis |
| 8,736,636 B2 | 5/2014 | Kang |
| 8,759,929 B2 | 6/2014 | Shiozawa et al. |
| 8,793,770 B2 | 7/2014 | Lim |
| 8,823,855 B2 | 9/2014 | Hwang |
| 8,847,988 B2 | 9/2014 | Geisner et al. |
| 8,874,673 B2 | 10/2014 | Kim |
| 9,010,929 B2 | 4/2015 | Lewis |
| 9,015,501 B2 | 4/2015 | Gee |
| 9,086,537 B2 | 7/2015 | Iwasa et al. |
| 9,095,437 B2 | 8/2015 | Boyden et al. |
| 9,239,473 B2 | 1/2016 | Lewis |
| 9,244,293 B2 | 1/2016 | Lewis |
| 9,244,533 B2 | 1/2016 | Friend et al. |
| 9,383,823 B2 | 7/2016 | Geisner et al. |
| 9,489,027 B1 | 11/2016 | Ogletree |
| 9,519,305 B2 | 12/2016 | Wolfe |
| 9,581,820 B2 | 2/2017 | Robbins |
| 9,582,060 B2 | 2/2017 | Balatsos |
| 9,658,473 B2 | 5/2017 | Lewis |
| 9,671,566 B2 | 6/2017 | Abovitz et al. |
| 9,671,615 B1 | 6/2017 | Vallius et al. |
| 9,696,795 B2 | 7/2017 | Marcolina et al. |
| 9,798,144 B2 | 10/2017 | Sako et al. |
| 9,874,664 B2 | 1/2018 | Stevens et al. |
| 9,880,441 B1 | 1/2018 | Osterhout |
| 9,918,058 B2 | 3/2018 | Takahasi et al. |
| 9,955,862 B2 | 5/2018 | Freeman et al. |
| 9,978,118 B1 | 5/2018 | Ozgumer et al. |
| 9,996,797 B1 | 6/2018 | Holz et al. |
| 10,018,844 B2 | 7/2018 | Levola et al. |
| 10,082,865 B1 | 9/2018 | Raynal et al. |
| 10,151,937 B2 | 12/2018 | Lewis |
| 10,185,147 B2 | 1/2019 | Lewis |
| 10,218,679 B1 | 2/2019 | Jawahar |
| 10,241,545 B1 | 3/2019 | Richards et al. |
| 10,317,680 B1 | 6/2019 | Richards et al. |
| 10,436,594 B2 | 10/2019 | Belt et al. |
| 10,516,853 B1 | 12/2019 | Gibson et al. |
| 10,527,853 B2 | 1/2020 | Kimmel |
| 10,551,879 B1 | 2/2020 | Richards et al. |
| 10,578,870 B2 | 3/2020 | Kimmel |
| 10,698,202 B2 | 6/2020 | Kimmel et al. |
| 10,825,424 B2 | 11/2020 | Zhang |
| 10,856,107 B2 | 12/2020 | Mycek et al. |
| 10,987,176 B2 | 4/2021 | Poltaretskyi et al. |
| 11,190,681 B1 | 11/2021 | Brook et al. |
| 11,199,713 B2 | 12/2021 | Kimmel |
| 11,209,656 B1 | 12/2021 | Choi et al. |
| 11,236,993 B1 | 2/2022 | Hall et al. |
| 11,874,468 B2 | 1/2024 | Kimmel |
| 11,900,626 B2 | 2/2024 | Tang |
| 2001/0010598 A1 | 8/2001 | Aritake et al. |
| 2002/0007463 A1 | 1/2002 | Fung |
| 2002/0063913 A1 | 5/2002 | Nakamura et al. |
| 2002/0071050 A1 | 6/2002 | Homberg |
| 2002/0108064 A1 | 8/2002 | Nunally |
| 2002/0122648 A1 | 9/2002 | Mule' et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |
| 2004/0174496 A1 | 9/2004 | Ji et al. |
| 2004/0186902 A1 | 9/2004 | Stewart |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0052621 A1 | 3/2005 | Allen et al. |
| 2005/0157159 A1 | 7/2005 | Komiya et al. |
| 2005/0177385 A1 | 8/2005 | Hull |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0126181 A1 | 6/2006 | Levola |
| 2006/0126182 A1 | 6/2006 | Levola |
| 2006/0129852 A1 | 6/2006 | Bonola |
| 2006/0132914 A1 | 6/2006 | Weiss et al. |
| 2006/0179329 A1 | 8/2006 | Terechko |
| 2006/0221448 A1 | 10/2006 | Nivon et al. |

(56) References Cited

U.S. PATENT DOCUMENTS

| | | |
|---|---|---|
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0043334 A1 | 2/2008 | Itzkovitch et al. |
| 2008/0046773 A1 | 2/2008 | Ham |
| 2008/0050013 A1 | 2/2008 | Munro |
| 2008/0063802 A1 | 3/2008 | Maula et al. |
| 2008/0068557 A1 | 3/2008 | Menduni et al. |
| 2008/0146942 A1 | 6/2008 | Dala-Krishna |
| 2008/0173036 A1 | 7/2008 | Willaims |
| 2008/0177506 A1 | 7/2008 | Kim |
| 2008/0205838 A1 | 8/2008 | Crippa et al. |
| 2008/0215907 A1 | 9/2008 | Wilson |
| 2008/0225393 A1 | 9/2008 | Rinko |
| 2008/0316768 A1 | 12/2008 | Travis |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0153934 A1 | 6/2010 | Lachner |
| 2010/0194632 A1 | 8/2010 | Raento et al. |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0296163 A1 | 11/2010 | Sarikko |
| 2010/0321781 A1 | 12/2010 | Levola |
| 2011/0021263 A1 | 1/2011 | Anderson et al. |
| 2011/0022870 A1 | 1/2011 | Mcgrane |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2011/0317233 A1 | 12/2011 | Hayashibe et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0280348 A1 | 11/2012 | Chou et al. |
| 2012/0307075 A1 | 12/2012 | Margalit |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050258 A1 | 2/2013 | Liu et al. |
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0308861 A1 | 11/2013 | Cordara |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0313228 A1 | 10/2014 | Kasahara |
| 2014/0340449 A1 | 11/2014 | Plagemann et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0025365 A1 | 1/2015 | Russell et al. |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vasquez, II et al. |
| 2015/0132003 A1 | 5/2015 | Greiner et al. |
| 2015/0132596 A1 | 5/2015 | Yamada et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1 | 10/2015 | Eden |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0027215 A1 | 1/2016 | Burns et al. |
| 2016/0033770 A1 | 2/2016 | Fujimaki et al. |
| 2016/0073069 A1 | 3/2016 | Xue |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1 | 3/2016 | Buckley et al. |
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |

(56) References Cited

U.S. PATENT DOCUMENTS

| | | |
|---|---|---|
| 2016/0267708 A1 | 9/2016 | Nistico et al. |
| 2016/0274733 A1 | 9/2016 | Hasegawa et al. |
| 2016/0277645 A1 | 9/2016 | Bitouk |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0068020 A1 | 3/2017 | Batchko et al. |
| 2017/0100664 A1 | 4/2017 | Osterhout et al. |
| 2017/0115487 A1 | 4/2017 | Travis |
| 2017/0118452 A1 | 4/2017 | Ogi et al. |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0185261 A1 | 6/2017 | Perez et al. |
| 2017/0192239 A1 | 7/2017 | Nakamura et al. |
| 2017/0201709 A1 | 7/2017 | Igarashi et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0214893 A1 | 7/2017 | Naftali et al. |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0266529 A1 | 9/2017 | Reikmoto |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Liu et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0357332 A1 | 12/2017 | Balan et al. |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |
| 2018/0131907 A1 | 5/2018 | Schmirier et al. |
| 2018/0136466 A1 | 5/2018 | Ko |
| 2018/0144691 A1 | 5/2018 | Choi et al. |
| 2018/0151796 A1 | 5/2018 | Akahane |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0218545 A1 | 8/2018 | Garcia et al. |
| 2018/0250589 A1 | 9/2018 | Cossairt et al. |
| 2018/0284877 A1 | 10/2018 | Klein |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0137788 A1 | 5/2019 | Suen |
| 2019/0155439 A1 | 5/2019 | Mukherjee et al. |
| 2019/0158926 A1 | 5/2019 | Kang et al. |
| 2019/0167095 A1 | 6/2019 | Krueger |
| 2019/0172216 A1 | 6/2019 | Ninan et al. |
| 2019/0178654 A1 | 6/2019 | Hare |
| 2019/0196690 A1 | 6/2019 | Chong et al. |
| 2019/0219815 A1 | 7/2019 | Price et al. |
| 2019/0243123 A1 | 8/2019 | Bohn |
| 2019/0287270 A1 | 9/2019 | Nakamura et al. |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2020/0066045 A1 | 2/2020 | Stahl et al. |
| 2020/0098188 A1 | 3/2020 | Bar-Zeev et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0184217 A1 | 6/2020 | Faulkner |
| 2020/0184653 A1 | 6/2020 | Faulker |
| 2020/0202759 A1 | 6/2020 | Ukai et al. |
| 2020/0242848 A1 | 7/2020 | Ambler et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0391115 A1 | 12/2020 | Leeper et al. |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0142582 A1 | 5/2021 | Jones et al. |
| 2021/0150264 A1 | 5/2021 | Karanam |
| 2021/0158627 A1 | 5/2021 | Cossairt et al. |
| 2021/0173480 A1 | 6/2021 | Osterhout et al. |
| 2021/0319236 A1 | 10/2021 | Tang |
| 2021/0333551 A1 | 10/2021 | Schultz |
| 2022/0366598 A1 | 11/2022 | Azimi et al. |
| 2023/0351808 A1 | 11/2023 | Jarvenpaa |
| 2023/0384593 A1 | 11/2023 | Ofir |
| 2024/0103212 A1 | 3/2024 | Jarvenpaa |
| 2025/0039342 A1 | 1/2025 | Traczyk et al. |
| 2025/0189802 A1 | 6/2025 | Ofir |

FOREIGN PATENT DOCUMENTS

| | | |
|---|---|---|
| CN | 104603675 A | 5/2015 |
| CN | 106662754 A | 5/2017 |
| CN | 107683497 A1 | 2/2018 |
| CN | 105190427 B | 11/2019 |
| EP | 0504930 A1 | 3/1992 |
| EP | 0535402 A1 | 4/1993 |
| EP | 0632360 A1 | 1/1995 |
| EP | 1215522 A2 | 6/2002 |
| EP | 13451682 A2 | 2/2003 |
| EP | 1494110 A2 | 1/2005 |
| EP | 1938141 A1 | 7/2008 |
| EP | 1943556 A2 | 7/2008 |

(56) References Cited

FOREIGN PATENT DOCUMENTS

| EP | 2290428 | A2 | 3/2011 |
|---|---|---|---|
| EP | 2350774 | A1 | 8/2011 |
| EP | 1237067 | B1 | 1/2016 |
| EP | 3139245 | A1 | 3/2017 |
| EP | 3164776 | B1 | 5/2017 |
| EP | 3236211 | A1 | 10/2017 |
| EP | 2723240 | B1 | 8/2018 |
| EP | 2896986 | B1 | 2/2021 |
| GB | 2499635 | A | 8/2013 |
| GB | 2542853 | A | 4/2017 |
| IN | 938/DEL/2004 | A | 6/2006 |
| JP | 09-121370 | A | 5/1997 |
| JP | 2002-529806 | | 9/2002 |
| JP | 2003-029198 | A | 1/2003 |
| JP | 2003-141574 | A | 5/2003 |
| JP | 2003-228027 | A | 8/2003 |
| JP | 2003-329873 | A | 11/2003 |
| JP | 2004-348169 | A | 12/2004 |
| JP | 2007-012530 | A | 1/2007 |
| JP | 2007-86696 | A | 4/2007 |
| JP | 2007-273733 | A | 10/2007 |
| JP | 2008-257127 | A | 10/2008 |
| JP | 2009-090689 | A | 4/2009 |
| JP | 2009-244869 | A | 10/2009 |
| JP | 2011-033993 | A | 2/2011 |
| JP | 2012-015774 | A | 1/2012 |
| JP | 2012-15774 | A | 1/2012 |
| JP | 2013-525872 | A1 | 6/2013 |
| JP | 2015-191032 | A | 11/2015 |
| JP | 2016-502120 | A | 1/2016 |
| JP | 2016-85463 | A | 5/2016 |
| JP | 2016-516227 | A | 6/2016 |
| JP | 2017-531840 | A | 10/2017 |
| JP | 6232763 | B2 | 11/2017 |
| JP | 6333965 | B2 | 5/2018 |
| KR | 2005-0010775 | A | 1/2005 |
| KR | 10-1372623 | B1 | 3/2014 |
| TW | 201219829 | A | 5/2012 |
| TW | 201803289 | A | 1/2018 |
| WO | 1991/000565 | A2 | 1/1991 |
| WO | 2000/030368 | A1 | 6/2000 |
| WO | 2002/071315 | A2 | 9/2002 |
| WO | 2004095248 | A | 11/2004 |
| WO | 2006132614 | A1 | 12/2006 |
| WO | 2007/037089 | A1 | 5/2007 |
| WO | 2007/085682 | A1 | 8/2007 |
| WO | 2007/102144 | A1 | 9/2007 |
| WO | 2008148927 | A1 | 12/2008 |
| WO | 2009060125 | A1 | 5/2009 |
| WO | 2009/101238 | A1 | 8/2009 |
| WO | 2012030787 | A2 | 3/2012 |
| WO | 2013/049012 | A1 | 4/2013 |
| WO | 2013062701 | A1 | 5/2013 |
| WO | 2014033306 | A1 | 3/2014 |
| WO | 2015143641 | A1 | 10/2015 |
| WO | 2016/054092 | A1 | 4/2016 |
| WO | 2017004695 | A1 | 1/2017 |
| WO | 2017044761 | A1 | 3/2017 |
| WO | 2017120475 | A1 | 7/2017 |
| WO | 2017176861 | A1 | 10/2017 |
| WO | 2017/203201 | A1 | 11/2017 |
| WO | 2018/044537 | A1 | 3/2018 |
| WO | 2018087408 | A1 | 5/2018 |
| WO | 2018097831 | A1 | 5/2018 |
| WO | 2018166921 | A1 | 9/2018 |
| WO | 2019148154 | A1 | 8/2019 |
| WO | 2020010226 | A1 | 1/2020 |

OTHER PUBLICATIONS

"Extended European Search Report issued on Aug. 24, 2022", European Patent Application No. 20846338.0, (13 pages).
"Extended European Search Report issued on Aug. 8, 2022", European Patent Application No. 19898874.3, (8 pages).
"Extended European Search Report issued on Sep. 8, 2022", European Patent Application No. 20798769.4, (13 pages).
"First Examination Report Mailed on Jul. 28, 2022", Indian Patent Application No. 202047024232, (6 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GP P%5FSYNC/SA4/Docs/S4%2DI90526%2Ezip [retrieved on Apr. 12, 2019], Apr. 12, 2019, (98 pages).
"Non Final Office Action mailed on Sep. 19, 2022", U.S. Appl. No. 17/263,001, (14 pages).
"Second Office Action mailed on Jul. 13, 2022 with English Translation", Chinese Patent Application No. 201880079474.6, (10 pages).
"Second Office Action mailed on Jun. 20, 2022 with English Translation", Chinese Patent Application No. 201880089255.6, (14 pages).
Anonymous , "Koi Pond: Top iPhone App Store Paid App", https://web.archive.org/web/20080904061233/https://www.iphoneincanada.ca/reviews /koi-pond-top-iphone-app-store-paid-app/ - [retrieved on Aug. 9, 2022], (2 pages).
Chittineni, C. , et al., "Single filters for combined image geometric manipulation and enhancement", Proceedings of SPIE vol. 1903, Image and Video Processing, Apr. 8, 1993, San Jose, CA. (Year: 1993), pp. 111-121.
"Decision of Rejection mailed on Jan. 5, 2023 with English translation", Chinese Patent Application No. 201880079474.6, (10 pages).
"Extended European Search Report issued on Dec. 14, 2022", European Patent Application No. 20886547.7, (8 pages).
"Extended European Search Report mailed on Nov. 3, 2022", European Patent Application No. 20770244.0, (23 pages).
"Final Office Action mailed on Dec. 29, 2022", U.S. Appl. No. 17/098,059, (32 pages).
"Final Office Action mailed on Mar. 10, 2023", U.S. Appl. No. 17/357,795, (15 pages).
"First Office Action mailed on Dec. 22, 2022 with English translation", Chinese Patent Application No. 201980061450.2, (11 pages).
"First Office Action mailed on Jan. 24, 2023 with English translation", Japanese Patent Application No. 2020-549034, (7 pages).
"First Office Action mailed on Jan. 30, 2023 with English translation", Chinese Patent Application No. 201980082951.9, (5 pages).
"First Office Action mailed on Sep. 16, 2022 with English translation", Chinese Patent Application No. 201980063642.7, (7 pages).
"Non Final Office Action mailed on Dec. 7, 2022", U.S. Appl. No. 17/357,795, (63 pages).
"Non Final Office Action mailed on Feb. 3, 2023", U.S. Appl. No. 17/429,100, (16 pages).
"Non Final Office Action mailed on Feb. 3, 2023", U.S. Appl. No. 17/497,965, (32 pages).
"Non Final Office Action mailed on Jan. 24, 2023", U.S. Appl. No. 17/497,940, (10 pages).
"Non Final Office Action mailed on Mar. 1, 2023", U.S. Appl. No. 18/046,739, (34 pages).
"Notice of Reason for Rejection mailed on Oct. 28, 2022 with English translation", Japanese Patent Application No. 2020-531452, (3 pages).
"Office Action mailed on Nov. 24, 2022 with English Translation", Japanese Patent Application No. 2020-533730, (11 pages).
"Office Action mailed Nov. 21, 2023 with English Translation", Japanese Patent Application No. 2021-535716, (15 pages).
Office Action mailed on Apr. 13, 2023, Japanese Patent Application No. 2020-533730, (13 pages).
"Office Action mailed on Dec. 14, 2023 with English translation", Japanese Patent Application No. 2021-526564, (13 pages).
"Office Action mailed on Feb. 19, 2024 with English translation", Korean Patent Application No. 10-2020-7020552, (18 pages).
Office Action mailed on Feb. 26, 2024, Chinese Patent Application No. 201980069194.1, (11 pages).
"Office Action mailed on Jul. 20, 2023 with English translation", Japanese Patent Application No. 2021-505884, (6 pages).
"Office Action mailed on Jun. 8, 2023 with English translation", Japanese Patent Application No. 2021-503762, (6 pages).

(56)           References Cited

OTHER PUBLICATIONS

"Office Action mailed on Mar. 30, 2023 with English translation", Japanese Patent Application No. 2020-566620, (10 pages).
"Office Action mailed on Mar. 6, 2024 with English translation", Chinese Patent Application No. 201980053016.X, (7 pages).
"Office Action mailed on Nov. 17, 2023 with English translation", Korean Patent Application No. 10-2023-7036734, (5 pages).
"Office Action mailed on Nov. 8, 2023 with English translation", Chinese Patent Application No. 201980060018.1, (12 pages).
"Penultimate Office Action mailed on Oct. 19, 2023 with English translation", Japanese Patent Application No. 2021-509779, (5 pages).
"Second Office Action mailed on May 2, 2023 with English Translation", Japanese Patent Application No. 2020-549034, (6 pages).
"Second Office Action mailed on Sep. 25, 2023 with English translation", Japanese Patent Application No. 2020-567853, (8 pages).
"Second Office Action with English translation mailed on Jul. 2, 2024", Chinese Patent Application No. 201980032005.3, (15 pages).
"Wikipedia Dioptre", Jun. 22, 2018 (Jun. 22, 2018), XP093066995,Retrieved from the Internet: URL:https://en.wikipedia.org/w/index.php? title=Dioptre&direction=next&oldid=846451540 [retrieved on Jul. 25, 2023], (3 pages).
Li, Yujia, et al., "Graph Matching Networks for Learning the Similarity of Graph Structured Objects", arxiv.org, Cornell University Library, 201 Olin Library Cornell University Ithaca, NY 14853, XP081268608, Apr. 29, 2019.
Luo, Zixin , et al., "ContextDesc: Local Descriptor Augmentation With Cross-Modality Context", 2019 IEEE/CVF Conference On Computer Vision and Pattern Recognition (CVPR), IEEE, XP033686823, DOI: 10.1109/CVPR.2019.00263 [retrieved on Jan. 8, 2020], Jun. 15, 2019, pp. 2522-2531.
Zhang, Zen , et al., "Deep Graphical Feature Learning for the Feature Matching Problem", 2019 IEEE/CVF International Conference On Computer Vision (ICCV), IEEE, XP033723985, DOI: 10.1109/ICCV.2019.00519 [retrieved on Feb. 24, 2020], Oct. 27, 2019, pp. 5086-5095.
"Communication Pursuant to Article 94(3) EPC mailed on Feb. 7, 2025", European Patent Application No. 20154070.5, (7 pages).
"Communication Pursuant to Article 94(3) EPC mailed on Mar. 18, 2025", European Patent Application No. 19810142.0, (8 pages).
"Office Action mailed Feb. 20, 2025 with English translation", Japanese Patent Application No. 2024-135314, (6 pages).
"Office Action mailed on Jan. 22, 2025 with English translation", Japanese Patent Application No. 2024-63271, (8 pages).
"Office Action mailed on Mar. 17, 2025 with English Translation", Japanese Patent Application No. 2023-221068, (9 pages).
"Communication according to Rule 164(1) EPC mailed on Feb. 23, 2022", European Patent Application No. 20753144.3, (11 pages).
"Communication Pursuant to Article 94(3) EPC mailed on Apr. 25, 2022", European Patent Application No. 18885707.2, (5 pages).
"Communication Pursuant to Article 94(3) EPC mailed on Jan. 4, 2022", European Patent Application No. 20154070.5, (8 pages).
"Communication Pursuant to Article 94(3) EPC mailed on May 30, 2022", European Patent Application No. 19768418.6, (6 pages).
"Extended European Search Report mailed on Jan. 28, 2022", European Patent Application No. 19815876.8, (9 pages).
"Extended European Search Report mailed on Jan. 4, 2022", European Patent Application No. 19815085.6, (9 pages).
"Extended European Search Report mailed on Jun. 19, 2020", European Patent Application No. 20154750.2, (10 pages).
"Extended European Search Report mailed on Mar. 22, 2022", European Patent Application No. 19843487.0, (14 pages).
"Extended European Search Report mailed on May 16, 2022", European Patent Application No. 19871001.4, (9 pages).
"Extended European Search Report mailed on May 30, 2022", European Patent Application No. 20753144.3, (10 pages).
"Final Office Action mailed on Feb. 23, 2022", U.S. Appl. No. 16/748,193, (23 pages).

"Final Office Action mailed on Feb. 3, 2022", U.S. Appl. No. 16/864,721, (36 pages).
"Final Office Action mailed on Jul. 13, 2022", U.S. Appl. No. 17/262,991, (18 pages).
"First Examination Report Mailed on May 13, 2022", Indian Patent Application No. 202047026359, (8 pages).
"First Office Action mailed on Mar. 14, 2022 with English translation", Chinese Patent Application No. 201880079474.6, (11 pages).
"Non Final Office Action mailed on Apr. 1, 2022", U.S. Appl. No. 17/256,961, (65 pages).
"Non Final Office Action mailed on Apr. 11, 2022", U.S. Appl. No. 16/938,782, (52 pages).
"Non Final Office Action mailed on Apr. 12, 2022", U.S. Appl. No. 17/262,991, (60 pages).
"Non Final Office Action mailed on Feb. 2, 2022", U.S. Appl. No. 16/783,866, (8 pages).
"Non Final Office Action mailed on Jul. 26, 2022", U.S. Appl. No. 17/098,059, (28 pages).
"Non Final Office Action mailed on Mar. 31, 2022", U.S. Appl. No. 17/257,814, (60 pages).
"Non Final Office Action mailed on Mar. 9, 2022", U.S. Appl. No. 16/870,676, (57 pages).
"Non Final Office Action mailed on May 10, 2022", U.S. Appl. No. 17/140,921, (25 pages).
"Non Final Office Action mailed on May 17, 2022", U.S. Appl. No. 16/748,193, (11 pages).
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
Communication Pursuant to Article 94(3) EPC mailed on Sep. 4, 2019, European Patent Application No. 10793707.0 , (4 pages).
Communication Pursuant to Article 94(3) EPC mailed on Oct. 21, 2021, European Patent Application No. 16207441.3 , (4 pages).
Communication Pursuant to Rule 164(1) EPC mailed on Jul. 27, 2021, European Patent Application No. 19833664.6 , (11 pages).
European Search Report mailed on Oct. 15, 2020, European Patent Application No. 20180623.9 , (10 pages).
Examination Report mailed on Jun. 19, 2020, European Patent Application No. 20154750.2 , (10 pages).
Extended European Search Report issued on May 20, 2020, European Patent Application No. 20154070.5 , (7 pages).
Extended European Search Report issued on Jan. 22, 2021, European Patent Application No. 18890390.0 , (11 pages).
Extended European Search Report issued on Nov. 3, 2020, European Patent Application No. 18885707.2 , (7 pages).
Extended European Search Report issued on Jun. 30, 2021, European Patent Application No. 19811971.1 , (9 pages).
Extended European Search Report issued on Mar. 4, 2021, European Patent Application No. 19768418.6 , (9 pages).
Extended European Search Report issued on Nov. 4, 2020, European Patent Application No. 20190980.1 , (14 pages).
Extended European Search Report mailed on Jun. 12, 2017, European Patent Application No. 16207441.3 , (8 pages).
Extended European Search Report mailed on Jul. 16, 2021, European Patent Application No. 19810142.0 , (14 pages).
Extended European Search Report mailed on Jul. 30, 2021, European Patent Application No. 19839970.1 , (7 pages).
Extended European Search Report mailed on Oct. 27, 2021, European Patent Application No. 19833664.6 , (10 pages).
Extended European Search Report mailed on Sep. 20, 2021, European Patent Application No. 19851373.1 , (8 pages).
Extended European Search Report mailed on Sep. 28, 2021, European Patent Application No. 19845418.3 , (13 pages).
Final Office Action mailed on Aug. 10, 2020, U.S. Appl. No. 16/225,961 , (13 pages).
Final Office Action mailed on Dec. 4, 2019, U.S. Appl. No. 15/564,517 , (15 pages).
Final Office Action mailed on Feb. 19, 2020, U.S. Appl. No. 15/552,897 , (17 pages).
Final Office Action mailed on Jun. 15, 2021, U.S. Appl. No. 16/928,313 , (42 pages).
Final Office Action mailed on Mar. 1, 2021, U.S. Appl. No. 16/214,575 , (29 pages).

(56) References Cited

OTHER PUBLICATIONS

Final Office Action mailed on Mar. 19, 2021, U.S. Appl. No. 16/530,776 , (25 pages).

Final Office Action mailed on Nov. 24, 2020, U.S. Appl. No. 16/435,933 , (44 pages).

Final Office Action mailed on Sep. 17, 2021, U.S. Appl. No. 16/938,782 , (44 pages).

International Search Report and Written Opinion mailed on Feb. 12, 2021, International Application No. PCT/US20/60555 , (25 pages).

International Search Report and Written Opinion mailed on Mar. 12, 2020, International PCT Patent Application No. PCT/US19/67919 , (14 pages).

International Search Report and Written Opinion mailed on Aug. 15, 2019, International PCT Patent Application No. PCT/US19/33987 , (20 pages).

International Search Report and Written Opinion mailed on Jun. 15, 2020, International PCT Patent Application No. PCT/US2020/017023 , (13 pages).

International Search Report and Written Opinion mailed on Oct. 16, 2019, International PCT Patent Application No. PCT/US19/43097 , (10 pages).

International Search Report and Written Opinion mailed on Oct. 16, 2019, International PCT Patent Application No. PCT/US19/36275 , (10 pages).

International Search Report and Written Opinion mailed on Oct. 16, 2019, International PCT Patent Application No. PCT/US19/43099 , (9 pages).

International Search Report and Written Opinion mailed on Jun. 17, 2016, International PCT Patent Application No. PCT/FI2016/050172 , (9 pages).

International Search Report and Written Opinion mailed on Feb. 2, 2021, International PCT Patent Application No. PCT/US20/60550 , (9 pages).

International Search Report and Written Opinion mailed on Oct. 22, 2019, International PCT Patent Application No. PCT/US19/43751 , (9 pages).

International Search Report and Written Opinion mailed on Dec. 23, 2019, International PCT Patent Application No. PCT/US19/44953 , (11 pages).

International Search Report and Written Opinion mailed on May 23, 2019, International PCT Patent Application No. PCT/US18/66514 , (17 pages).

International Search Report and Written Opinion mailed on Sep. 26, 2019, International PCT Patent Application No. PCT/US19/40544 , (12 pages).

International Search Report and Written Opinion mailed on Aug. 27, 2019, International PCT Application No. PCT/US2019/035245 , (8 pages).

International Search Report and Written Opinion mailed on Dec. 27, 2019, International Application No. PCT/US19/47746 , (16 pages).

International Search Report and Written Opinion mailed on Dec. 3, 2020, International Patent Application No. PCT/US20/43596 , (25 pages).

International Search Report and Written Opinion mailed on Sep. 30, 2019, International Patent Application No. PCT/US19/40324 , (7 pages).

International Search Report and Written Opinion mailed on Sep. 4, 2020, International Patent Application No. PCT/US20/31036 , (13 pages).

International Search Report and Written Opinion mailed on Jun. 5, 2020, International Patent Application No. PCT/US20/19871 , (9 pages).

International Search Report and Written Opinion mailed on Aug. 8, 2019, International PCT Patent Application No. PCT/US2019/034763 , (8 pages).

International Search Report and Written Opinion mailed on Oct. 8, 2019, International PCT Patent Application No. PCT/US19/41151 , (7 pages).

International Search Report and Written Opinion mailed on Jan. 9, 2020, International Application No. PCT/US19/55185 , (10 pages).

International Search Report and Written Opinion mailed on Feb. 28, 2019, International Patent Application No. PCT/US18/64686 , (8 pages).

International Search Report and Written Opinion mailed on Feb. 7, 2020, International PCT Patent Application No. PCT/US2019/061265 , (11 pages).

International Search Report and Written Opinion mailed on Jun. 11, 2019, International PCT Application No. PCT/US19/22620 , (7 pages).

Invitation to Pay Additional Fees mailed Aug. 15, 2019, International PCT Patent Application No. PCT/US19/36275 , (2 pages).

Invitation to Pay Additional Fees mailed Sep. 24, 2020, International Patent Application No. PCT/US2020/043596 , (3 pages).

Invitation to Pay Additional Fees mailed on Oct. 22, 2019, International PCT Patent Application No. PCT/US19/47746 , (2 pages).

Invitation to Pay Additional Fees mailed on Apr. 3, 2020, International Patent Application No. PCT/US20/17023 , (2 pages).

Invitation to Pay Additional Fees mailed on Oct. 17, 2019, International PCT Patent Application No. PCT/US19/44953 , (2 pages).

"Multi-core processor", TechTarget , 2013 , (1 page).

Non Final Office Action mailed Nov. 19. 2019, U.S. Appl. No. 16/355,611 , (31 pages).

Non Final Office Action mailed on Aug. 21, 2019, U.S. Appl. No. 15/564,517 , (14 pages).

Non Final Office Action mailed on Aug. 4, 2021, U.S. Appl. No. 16/864,721 , (51 pages).

Non Final Office Action mailed on Jan. 26, 2021, U.S. Appl. No. 16/928,313 , (33 pages).

Non Final Office Action mailed on Jan. 27, 2021, U.S. Appl. No. 16/225,961 , (15 pages).

Non Final Office Action mailed on Jul. 27, 2020, U.S. Appl. No. 16/435,933 , (16 pages).

Non Final Office Action mailed on Jul. 9, 2021, U.S. Appl. No. 17/002,663 , (43 pages).

Non Final Office Action mailed on Jul. 9, 2021, U.S. Appl. No. 16/833,093 , (47 pages).

Non Final Office Action mailed on Jun. 10, 2021, U.S. Appl. No. 16/938,782 , (40 Pages).

Non Final Office Action mailed on Jun. 17, 2020, U.S. Appl. No. 16/682,911 , (22 pages).

Non Final Office Action mailed on Jun. 19, 2020, U.S. Appl. No. 16/225,961 , (35 pages).

Non Final Office Action mailed on Jun. 29, 2021, U.S. Appl. No. 16/698,588 , (58 pages).

Non Final Office Action mailed on Mar. 3, 2021, U.S. Appl. No. 16/427,337 , (41 pages).

Non Final Office Action mailed on May 26, 2021, U.S. Appl. No. 16/214,575 , (19 pages).

Non Final Office Action mailed on Nov. 19, 2019, U.S. Appl. No. 16/355,611 , (31 pages).

Non Final Office Action mailed on Nov. 5, 2020, U.S. Appl. No. 16/530,776 , (45 pages).

Non Final Office Action mailed on Oct. 22, 2019, U.S. Appl. No. 15/859,277 , (15 pages).

Non Final Office Action mailed on Sep. 1, 2020, U.S. Appl. No. 16/214,575 , (40 pages).

Non Final Office Action mailed on Sep. 20, 2021, U.S. Appl. No. 17/105,848 , (56 pages).

Non Final Office Action mailed on Sep. 29, 2021, U.S. Appl. No. 16/748,193, (62 pages).

Notice of Allowance mailed on Mar. 25, 2020, U.S. Appl. No. 15/564,517 , (11 pages).

Notice of Allowance mailed on Oct. 5, 2020, U.S. Appl. No. 16/682,911 , (27 pages).

Notice of Reason of Refusal mailed on Sep. 11, 2020 with English translation, Japanese Patent Application No. 2019-140435 , (6 pages).

"Phototourism Challenge", CVPR 2019 Image Matching Workshop. https://image matching-workshop. github.io. , (16 pages).

"Summons to attend oral proceedings pursuant to Rule 115(1) EPC mailed on Jul. 15, 2019", European Patent Application No. 15162521.7 , (7 pages).

(56) References Cited

OTHER PUBLICATIONS

Aarik, J. , et al. , "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351 ?via%3Dihub>; DOI: 10.1016/S0040-6090(97)00135-1; see entire document , (2 pages).

Altwaijry , et al. , "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] <URL: http://www.bmva.org/bmvc/2016/papers/paper049/index.html >, en lire document, especially Abstract.

Arandjelović, Relja , et al. , "Three things everyone should know to improve object retrieval", CVPR, 2012 , (8 pages).

Azom , "Silica—Silicon Dioxide (SiO2)", Azo Materials; Publication [Online]. Dec. 13, 2001 [retrieved Feb. 19, 2020]. Retrieved from the Internet: <URL: https://www.azom.com/article.aspx?Article1D=1114>.

Azuma, Ronald T. , "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).

Azuma, Ronald T. , "Predictive Tracking for Augmented Reality", Department of Computer Science, Chapel Hill NC; TR95-007, Feb. 1995 , 262 pages.

Battaglia, Peter W, et al. , "Relational inductive biases, deep learning, and graph networks", arXiv:1806.01261, Oct. 17, 2018 , pp. 1-40.

Berg, Alexander C , et al. , "Shape matching and object recognition using low distortion correspondences", In CVPR, 2005 , (8 pages).

Bian, Jiawang , et al. , "GMS: Grid-based motion statistics for fast, ultra-robust feature correspondence.", In CVPR (Conference on Computer Vision and Pattern Recognition), 2017 , (10 pages).

Bimber, Oliver , et al. , "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007) , (393 pages).

Brachmann, Eric , et al. , "Neural-Guided Ransac: Learning Where to Sample Model Hypotheses", In ICCV (International Conference on Computer Vision ), arXiv:1905.04132v2 [cs.CV] Jul. 31, 2019 , (17 pages).

Butail , et al. , "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.

Caetano, Tibério S , et al. , "Learning graph matching", IEEE TPAMI, 31(6):1048-1058, 2009.

Cech, Jan , et al. , "Efficient sequential correspondence selection by cosegmentation", IEEE TPAMI, 32(9):1568-1581, Sep. 2010.

Cuturi, Marco , "Sinkhorn distances: Lightspeed computation of optimal transport", NIPS, 2013 , (9 pages).

Dai, Angela , et al. , "ScanNet: Richly-annotated 3d reconstructions of indoor scenes", In CVPR, arXiv:1702.04405v2 [cs.CV] Apr. 11, 2017 , (22 pages).

Deng, Haowen , et al. , "PPFnet: Global context aware local features for robust 3d point matching", In CVPR, arXiv:1802.02669v2 [cs.CV] Mar. 1, 2018 , (12 pages).

Detone, Daniel , et al. , "Deep image homography estimation", In RSS Work-shop: Limits and Potentials of Deep Learning in Robotics, arXiv:1606.03798v1 [cs.CV] Jun. 13, 2016 , (6 pages).

Detone, Daniel , et al. , "Self-improving visual odometry", arXiv:1812.03245, Dec. 8, 2018 , (9 pages).

Detone, Daniel , et al. , "SuperPoint: Self-supervised interest point detection and description", In CVPR Workshop on Deep Learning for Visual SLAM, arXiv:1712.07629v4 [cs.CV] Apr. 19, 2018 , (13 pages).

Dusmanu, Mihai , et al. , "D2-net: A trainable CNN for joint detection and description of local features", CVPR, arXiv:1905.03561v1 [cs.CV] May 9, 2019 , (16 pages).

Ebel, Patrick , et al. , "Beyond cartesian representations for local descriptors", ICCV, arXiv:1908.05547v1 [cs.CV] Aug. 15, 2019 , (11 pages).

Fischler, Martin A , et al. , "Random sample consensus: a paradigm for model fitting with applications to image analysis and automated cartography", Communications of the ACM, 24(6): 1981 , pp. 381-395.

Gilmer, Justin , et al. , "Neural message passing for quantum chemistry", In ICML, arXiv:1704.01212v2 [cs.LG] Jun. 12, 2017 , (14 pages).

Giuseppe, Donato , et al. , "Stereoscopic helmet mounted system for real time 3D environment reconstruction and indoor ego—motion estimation", Proc. SPIE 6955, Head- and Helmet-Mounted Displays XIII: Design and Applications , 69550P.

Goodfellow , "Titanium Dioxide—Titania (TiO2)", Azo Materials; Publication [online]. Jan. 11, 2002 [retrieved Feb. 19, 2020]. Retrieved from the Internet: <URL: https://www.azom.com/article.aspx?Article1D=1179>.

Hartley, Richard , et al. , "Multiple View Geometry in Computer Vision", Cambridge University Press, 2003 , pp. 1-673.

Jacob, Robert J.K. , "Eye Tracking in Advanced Interface Design", Human-Computer Interaction Lab, Naval Research Laboratory, Washington, D.C., date unknown. 2003 , pp. 1-50.

Lee , et al. , "Self-Attention Graph Pooling", Cornell University Library/Computer Science/Machine Learning, Apr. 17, 2019 [retrieved on Jan. 8, 2021 from the Internet<URL: https://arxiv.org/abs/1904.08082 >, entire document.

Lee, Juho , et al. , "Set transformer: A framework for attention-based permutation-invariant neural networks", ICML, arXiv:1810.00825v3 [cs.LG] May 26, 2019 , (17 pages).

Leordeanu, Marius , et al. , "A spectral technique for correspondence problems using pairwise constraints", Proceedings of (ICCV) International Conference on Computer Vision, vol. 2, pp. 1482-1489, Oct. 2005 , (8 pages).

Levola, T. , "Diffractive Optics for Virtual Reality Displays", Journal of the SID Eurodisplay 14/05, 2005, XP008093627, chapters 2-3, Figures 2 and 10 , pp. 467-475.

Levola, Tapani , "Invited Paper: Novel Diffractive Optical Components for Near to Eye Displays—Nokia Research Center", SID 2006 DIGEST, 2006 SID International Symposium, Society for Information Display, vol. XXXVII, May 24, 2005, chapters 1-3, figures 1 and 3 , pp. 64-67.

Li, Yujia , et al. , "Graph matching networks for learning the similarity of graph structured objects", ICML, arXiv:1904.12787v2 [cs.LG] May 12, 2019 , (18 pages).

Li, Zhengqi , et al. , "Megadepth: Learning single-view depth prediction from internet photos", In CVPR, fromarXiv: 1804.00607v4 [cs.CV] Nov. 28, 2018 , (10 pages).

Libovicky , et al. , "Input Combination Strategies for Multi-Source Transformer Decoder", Proceedings of the Third Conference on Machine Translation (WMT). Volume 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.

Loiola, Eliane Maria, et al. , "A survey for the quadratic assignment problem", European journal of operational research, 176(2): 2007 , pp. 657-690.

Lowe, David G , "Distinctive image features from scale-invariant keypoints", International Journal of Computer Vision, 60(2): 91-110, 2004 , (28 pages).

Luo, Zixin , et al. , "ContextDesc: Local descriptor augmentation with cross-modality context", CVPR, arXiv:1904.04084v1 [cs.CV] Apr. 8, 2019 , (14 pages).

Memon, F. , et al. , "Synthesis, Characterization and Optical Constants of Silicon Oxycarbide", EPJ Web of Conferences; Publication [online]. Mar. 23, 2017 [retrieved Feb. 19, 2020) .<URL: https://www.epj-conferences.org/articles/epjconf/pdf/2017/08/epjconf_nanop2017 _00002.pdf>; DOI: 10.1051/epjconf/201713900002 , (8 pages).

Molchanov, Pavlo , et al. , "Short-range FMCW monopulse radar for hand-gesture sensing", 2015 IEEE Radar Conference (RadarCon) (2015) , pp. 1491-1496.

(56)                    References Cited

OTHER PUBLICATIONS

Mrad , et al. , "A framework for System Level Low Power Design Space Exploration", , (5 pagea).

Munkres, James , "Algorithms for the assignment and transportation problems", Journal of the Society for Industrial and Applied Mathematics, 5(1): 1957 , pp. 32-38.

Ono, Yuki , et al. , "LF-Net: Learning local features from images", 32nd Conference on Neural Information Processing Systems (NIPS 2018), arXiv:1805.09662v2 [cs.CV] Nov. 22, 2018 , (13 pages).

Paszke, Adam , et al. , "Automatic differentiation in Pytorch", 31st Conference on Neural Information Processing Systems (NIPS 2017), Long Beach, CA, USA , (4 pages).

Peyré, Gabriel , et al. , "Computational Optimal Transport", Foundations and Trends in Machine Learning, 11(5-6):355-607, 2019; arXiv:1803.00567v4 [stat.ML] Mar. 18, 2020 , (209 pages).

Qi, Charles Ruizhongtai, et al. , "Pointnet++: Deep hierarchical feature learning on point sets in a metric space.", 31st Conference on Neural Information Processing Systems (NIPS 2017), Long Beach, CA, USA. , (10 pages).

Qi, Charles R , et al. , "Pointnet: Deep Learning on Point Sets for 3D Classification and Segmentation", CVPR, arXiv:1612.00593v2 [cs.CV] Apr. 2, 1001 , (19 pages).

Radenović, Filip , et al. , "Revisiting Oxford and Paris: Large-Scale Image Retrieval Benchmarking", CVPR, arXiv:1803.11285v1 [cs. CV] Mar. 29, 2018 , (10 pages).

Raguram, Rahul , et al. , "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I , (15 pages).

Ranftl, René , et al. , "Deep fundamental matrix estimation", European Conference on Computer Vision (ECCV), 2018 , (17 pages).

Revaud, Jerome , et al. , "R2D2: Repeatable and Reliable Detector and Descriptor", In NeurIPS, arXiv:1906.06195v2 [cs.CV] Jun. 17, 2019 , (12 pages).

Rocco, Ignacio , et al. , "Neighbourhood Consensus Networks", 32nd Conference on Neural Information Processing Systems (NeurIPS 2018), Montréal, Canada, arXiv:1810.10510v2 [cs.CV] Nov. 29, 2018 , (20 pages).

Rublee, Ethan , et al. , "Orb: An efficient alternative to Sift or Surf", Proceedings of the IEEE International Conference on Computer Vision. 2564-2571. 2011; 10.1109/ICCV.2011.612654 , (9 pages).

Sarlin , et al. , "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911. 11763 >, entire document.

Sattler, Torsten , et al. , "SCRAMSAC: Improving RANSAC's efficiency with a spatial consistency filter", ICCV, 2009: 2090-2097. , (8 pages).

Schonberger, Johannes Lutz, et al. , "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.

Schonberger, Johannes Lutz, et al. , "Structure-from-motion revisited", Proceedings of the IEEE Conference on Computer Vision and Pattern Recognition (CVPR), 2016, pp. 4104-4113 , (11 pages).

Sheng, Liu , et al. , "Time-multiplexed dual-focal plane head-mounted display with a liquid lens", Optics Letters, Optical Society of Amer i ca, US, vol. 34, No. 11, Jun. 1, 2009 (Jun. 1, 2009), XP001524475, ISSN: 0146-9592 , pp. 1642-1644.

Sinkhorn, Richard , et al. , "Concerning nonnegative matrices and doubly stochastic matrices.", Pacific Journal of Mathematics, 1967 , pp. 343-348.

Spencer, T. , et al. , "Decomposition of poly(propylene carbonate) with UV sensitive iodonium 11 salts", Polymer Degradation and Stability; [online]. Dec. 24, 2010 (retrieved Feb. 19, 2020]. , (17 pages).

Tanriverdi, Vildan , et al. , "Interacting With Eye Movements in Virtual Environments", Department of Electrical Engineering and Computer Science, Tufts University; Proceedings of the SIGCHI conference on Human Factors in Computing Systems, Apr. 2000 , pp. 1-8.

Thomee, Bart , et al. , "YFCC100m: The new data in multimedia research", Communications of the ACM, 59(2):64-73, 2016; arXiv:1503. 01817v2 [cs.MM] Apr. 25, 2016 , (8 pages).

Torresani, Lorenzo , et al. , "Feature correspondence via graph matching: Models and global optimization", Computer Vision—ECCV 2008, 10th European Conference on Computer Vision, Marseille, France, Oct. 12-18, 2008, Proceedings, Part II , (15 pages).

Tuytelaars, Tinne , et al. , "Wide baseline stereo matching based on local, affinely invariant regions", BMVC, 2000 , pp. 1-14.

Ulyanov, Dmitry , et al. , "Instance normalization: The missing ingredient for fast stylization", arXiv:1607.08022v3 [cs.CV] Nov. 6, 2017 , (6 pages).

Vaswani, Ashish , et al. , "Attention is all you need", 31st Conference on Neural Information Processing Systems (NIPS 2017), Long Beach, CA, USA; arXiv:1706.03762v5 [cs.CL] Dec. 6, 2017 , (15 pages).

Veličković, Petar , et al. , "Graph attention networks", ICLR, arXiv:1710.10903v3 [stat.ML] Feb. 4, 2018 , (12 pages).

Villani, Cédric , "Optimal transport: old and new", vol. 338. Springer Science & Business Media, Jun. 2008 , pp. 1-998.

Wang, Xiaolong , et al. , "Non-local neural networks", CVPR, arXiv:1711.07971v3 [cs.CV] Apr. 13, 2018 , (10 pages).

Wang, Yue , et al. , "Deep Closest Point: Learning representations for point cloud registration", ICCV, arXiv:1905.03304v1 [cs.CV] May 8, 2019 , (10 pages).

Wang, Yue , et al. , "Dynamic Graph CNN for learning on point clouds", ACM Transactions on Graphics, arXiv:1801.07829v2 [cs. CV] Jun. 11, 2019 , (13 pages).

Weissel , et al. , "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/ 10.1145/581630.581668>.

Yi, Kwang Moo , et al. , "Learning to find good correspondences", CVPR, arXiv:1711.05971v2 [cs.CV] May 21, 2018 , (13 pages).

Yi, Kwang Moo , et al. , "Lift: Learned invariant feature transform", ECCV, arXiv:1603.09114v2 [cs.CV] Jul. 29, 2016 , (16 pages).

Zaheer, Manzil , et al. , "Deep Sets", 31st Conference on Neural Information Processing Systems (NIPS 2017), Long Beach, CA, USA; arXiv:1703.06114v3 [cs.LG] Apr. 14, 2018 , (29 pages).

Zhang, Jiahui , et al. , "Learning two-view correspondences and geometry using order-aware network", ICCV; aarXiv:1908. 04964v1 [cs.CV] Aug. 14, 2019 , (11 pages).

Zhang, Li , et al. , "Dual graph convolutional net-work for semantic segmentation", BMVC, 2019; arXiv:1909.06121v3 [cs.CV] Aug. 26, 2020 , (18 pages).

"Non Final Office Action mailed on Dec. 2, 2026", U.S. Appl. No. 18/517,915, (18 pages).

"Final Office Action mailed on Dec. 17, 2025", U.S. Appl. No. 18/674,016, (8 pages).

"Non Final Office Action mailed on Feb. 3, 2026", U.S. Appl. No. 18/643,757, (14 pages).

100
Align 98 with 96 by
swiveling about swivel axis
36 and rotating about
rotation axis 42

96/98

STAGING SYSTEM TO VERIFY ACCURACY OF A MOTION TRACKING SYSTEM

CROSS-REFERENCE TO RELATED APPLICATIONS

This application is a National Phase of International Application No. PCT/US2019/055185, filed on Oct. 8, 2019, which claims priority from U.S. Provisional Patent Application No. 62/745,218, filed on Oct. 12, 2018 and U.S. Provisional Patent Application No. 62/798,294, filed on Jan. 29, 2019, all of which are incorporated herein by reference in their entirety.

BACKGROUND TO THE INVENTION

1). Field of the Invention

This invention relates to an object detection system having a staging system that is used to verify accuracy of a motion tracking system.

2). Discussion of Related Art

Computers are used to created two-dimensional and three-dimensional renderings of real world objects. For example, computer games have two-dimensional and three-dimensional renderings of athletes and other humans that appear lifelike and move in a lifelike manner.

The way that these objects move is often pre-recorded using a motion tracking system. A motion tracking system may have a staging area where an athlete is located. A plurality of cameras are positioned around the athlete and are used to capture the locations of beacons that are attached to clothing worn by the athlete as the athlete performs a series of moves such as striking a golf ball, catching a football, etc.

The motion tracking system has a motion tracking system positioning algorithm that receives data from the cameras and determines the locations of the beacons. These locations are then recorded and are used to match a rendering of an athlete in a moving computer model.

It has become increasingly important that the motion tracking system record the locations of these beacons accurately. For purposes of accurately recording the movement of body parts of an athlete, the locations of the beacons relative to one another should be accurate. It is also very important that relative location of beacons does not change as an object (such as a human) is moving through space. For example, in the case of an athlete that is being captured, it is important that length and angles of arms or joints do not change as an athlete is moving across a large area and such errors tend be more pronounced when a large area is used for motion tracking. Furthermore, the locations of the beacons should be accurately determined relative to other real world objects. It is, for example, important that location of the athlete relative to the ground be accurate so that the athlete moves across the ground as opposed to floating above the ground or below it

SUMMARY OF THE INVENTION

The invention provides a method of detecting an object including (i) calibrating a staging system, including generating a stage calibration light beam, reflecting the stage calibration light beam from a target frame mirror, pivoting a target frame about a pivot axis between a first pivot angle and a second pivot angle relative to a mobile platform, detecting first and second locations of the stage calibration light beam after the stage calibration light beam is reflected from the target frame mirror when the target frame is in the first pivot angle and in the second pivot angle respectively, determining, based on the first and second locations, a value representing an orientation of the target frame mirror relative to the pivot axis and adjusting, based on the determination of the value representing the orientation of the target frame mirror, the orientation of the target frame mirror relative to the target frame so that the target frame mirror is more normal to the pivot axis.

The invention also provides a method of detecting an object including (i) calibrating a staging system, including generating a stage calibration light beam, reflecting the stage calibration light beam from a target frame mirror, pivoting a target frame about a pivot axis between a first pivot angle and a second pivot angle relative to a mobile platform, detecting first and second locations of the stage calibration light beam after the stage calibration light beam is reflected from the target frame mirror when the target frame is in the first pivot angle and in the second pivot angle respectively, determining, based on the first and second locations, a value representing an orientation of the target frame mirror relative to the pivot axis and adjusting, based on the determination of the value representing the orientation of the target frame mirror, the orientation of the target frame mirror relative to the target frame so that the target frame mirror is more normal to the pivot axis; (ii) using the staging system to generate a stage-based location of a beacon, including generating a stage positioning light beam, reflecting the stage positioning light beam from the target frame mirror, detecting a location of the stage positioning light beam after the stage positioning light beam is reflected from the target frame mirror and determining a stage-based location of the beacon on the target frame based on the stage positioning light beam; (iii) operating a motion tracking system to generate a motion tracking system-based location of the beacon, including detecting, with at least one detector, the beacon and a value of the beacon relative to the detector and determining, with a motion tracking system positioning algorithm, a motion tracking system-based location of the beacon relative to the motion tracking system-based on the value of the beacon relative to the detector; and (iv) verifying the motion tracking system, including comparing the motion tracking system-based location with the stage-based location to determine accuracy of the motion tracking system-based location.

The invention further provides an object detection system including (i) a staging system that includes a mobile platform, a target frame mounted to the mobile platform for pivotal movement about a pivot axis between a first pivot angle and a second pivot angle, a beacon on the target frame, a target frame mirror attached to the target frame, at least one light source generating a stage calibration light beam, for reflection from the target frame mirror, first and second locations of the stage calibration light beam after the stage calibration light beam is reflected from the target frame mirror being detectable when the target frame is in the first pivot angle and in the second pivot angle respectively, based on the first and second locations, a value being calculable representing an orientation of the target frame mirror relative to the pivot axis, a mirror orientation adjustment mechanism between the target frame mirror and the target frame to adjust, based on the determination of the value representing the orientation of the target frame mirror, the orientation of the target frame mirror so that the target frame mirror is more normal to the pivot axis, the at least one light source generating and reflecting a stage positioning light beam from the target frame mirror, a location of the stage positioning light beam after the stage positioning light beam is reflected from the target frame mirror being detectable and a stage location algorithm to determine a stage-based location of the beacon on the target frame based on the stage positioning light beam and (ii) a motion tracking system that includes at least one detector positioned to detect the beacon and a value of the beacon relative to the detector and a motion tracking system positioning algorithm for receiving the value of the beacon relative to the detector as an input, the motion tracking system positioning algorithm to determine a motion tracking system-based location of the beacon relative to the motion tracking system as an output from the motion tracking system positioning algorithm for comparing the motion tracking system-based location with the stage-based location to determine accuracy of the motion tracking system-based location.

BRIEF DESCRIPTION OF THE DRAWINGS

The invention described by way of example with reference to the accompanying drawings, wherein.

DETAILED DESCRIPTION OF THE INVENTION

Figure 1:
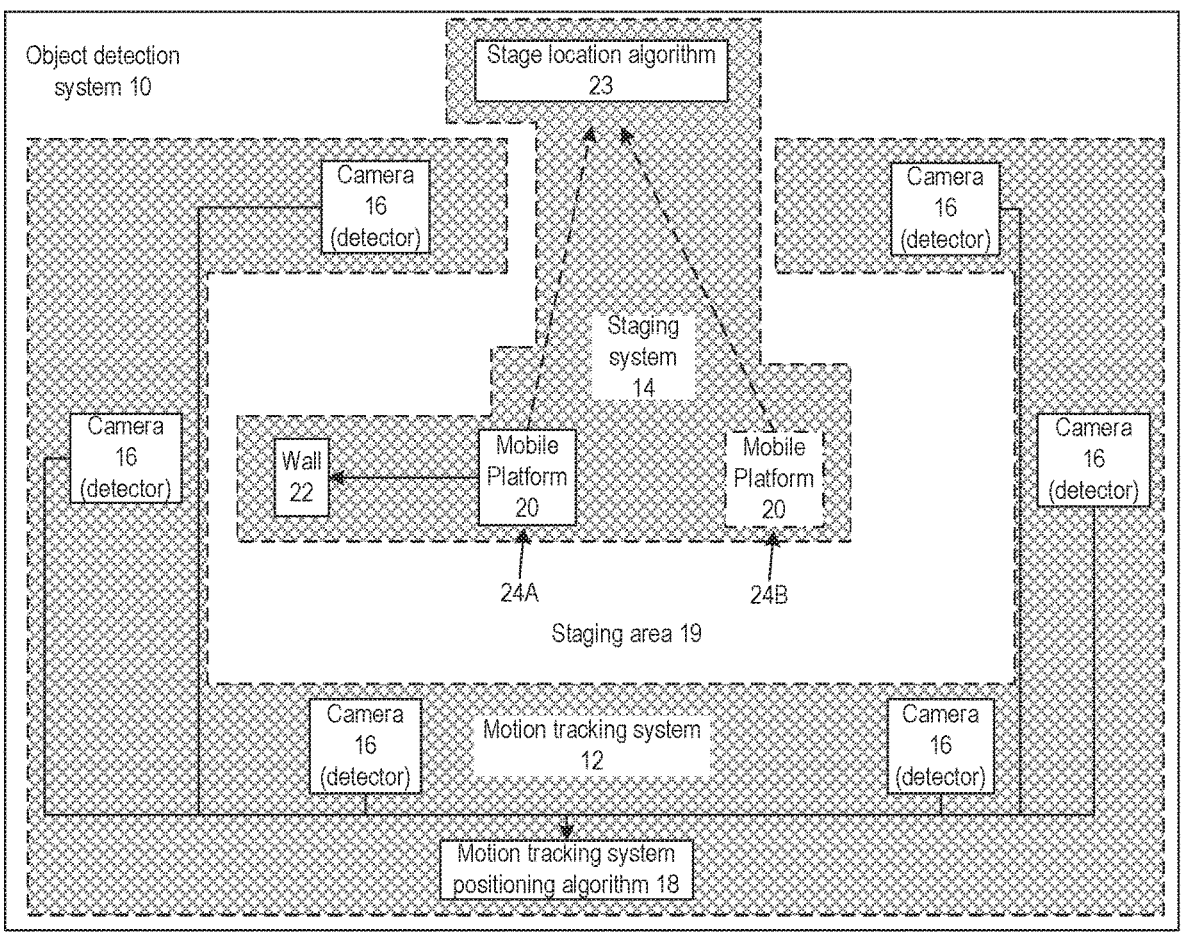
FIG. 1 is a top plan view showing an object detection system, according to an embodiment of the invention.

FIG. 1 of the accompanying drawings illustrates an object detection system 10, according to an embodiment of the invention, including a motion tracking system 12 and a staging system 14 that is used to verify accuracy of the motion tracking system 12.

The motion tracking system 12 includes a plurality of detectors in the form of respective cameras 16 and a motion tracking system positioning algorithm 18.

The cameras 16 are positioned on front, back, left and right sides of a staging area 19. Each camera 16 is positioned to capture an image, or multiple frames of images, of an object located in the staging area 19.

The motion tracking system positioning algorithm 18 is located on a storage device of a computing device. The cameras 16 are connected to the computing device and provide data of images that are captured by the cameras 16 to the motion tracking system positioning algorithm 18. The motion tracking system positioning algorithm 18 executes a routine that determines a location of the object in the staging area 19 based on the data received from the cameras 16.

FIG. 1 shows only limited details of the staging system 14, including a mobile platform 20, a wall 22 and a stage location algorithm 23. The mobile platform 20 is located within the staging area 19. The mobile platform 20 is first located at a first position 24A and is later moved to second position 24B. Various light beams are used to locate the mobile platform 20 relative to the wall 22. The stage location algorithm 23 resides on a computer-readable medium of a computing device. The stage location algorithm 23 calculates a location of an object on the mobile platform 20 after the mobile platform 20 is positioned relative to the wall 22.

Figure 2:
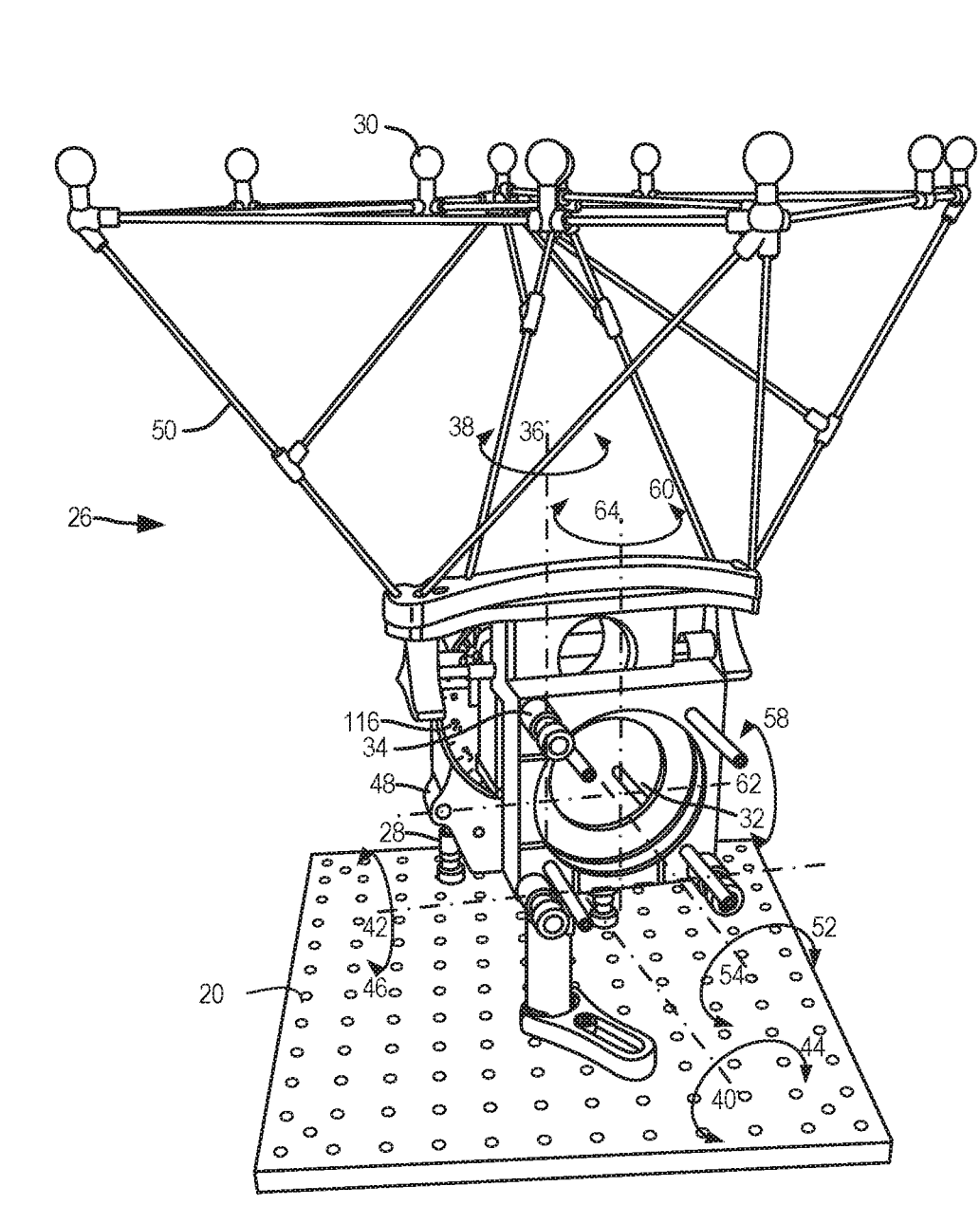
FIG. 2 is a perspective view showing components of a staging system forming part of the object detection system.

FIG. 2 shows further components of the staging system 14 that are not shown in FIG. 1, including a target frame 26, a frame adjustment mechanism 28, a plurality of beacons 30, a target frame mirror 32 and mirror orientation adjustment mechanism 34.

The frame adjustment mechanism 28 mounts the target frame 26 to the mobile platform 20. The frame adjustment mechanism 28 can swivel about a vertical swivel axis 36 relative to the mobile platform 20. When the frame adjustment mechanism 28 swivels about the vertical swivel axis 36, the target frame 26 swivels in a direction 38 about the vertical swivel axis 36.

The frame adjustment mechanism 28 includes a plurality of adjustment screws that further allow for adjustment of the target frame 26 relative to the mobile platform 20. The target frame 26 can be rotated about horizontal axes 40 and 42 in directions 44 and 46 respectively.

The target frame 26 includes a base portion 48 that is mounted to the frame adjustment mechanism 28 and an upper portion 50. The upper portion 50 is mounted to the base portion 48 through a bearing. The bearing allows for the upper portion 50 to pivot in a direction 52 about a horizontal pivot axis 54. Pivoting of the upper portion 50 about the horizontal pivot axis 54 also pivots the upper portion 50 in the direction 52 relative to the mobile platform 20.

The target frame mirror 32 is mounted through the mirror orientation adjustment mechanism 34 to the upper portion 50 of the target frame 26. The mirror orientation adjustment mechanism 34 has a plurality of adjustment screws that, when rotated, adjust the target frame mirror 32 relative to the upper portion 50 of the target frame 26. The mirror orientation adjustment mechanism 34 adjusts the target frame mirror 32 in directions 58 and 60 about horizontal and vertical axes 62 and 64, respectively.

The beacons 30 are mounted to the upper portion 50 of the target frame 26. The beacons 30 may be "passive beacons" that made of a material that is easily detectable by the cameras 16 in FIG. 1 or may be "active beacon" such as light-emitting diodes (LED's) or other objects that emit visible or invisible light that can be detected by a camera. Any adjustment of the target frame 26 about the axes 36, 40, 42 or 54 causes simultaneous adjustment of the locations of the beacons 30 relative to the mobile platform 20. The beacons 30, however, remain stationary when the target frame mirror 32 is adjusted about the axes 62 and 64.

Figure 3:
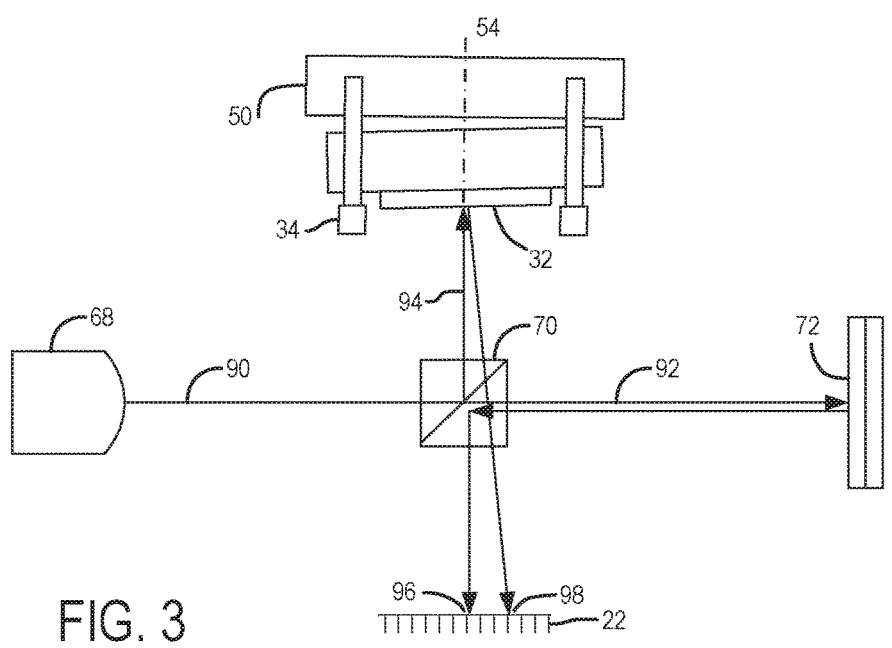
FIG. 3 is a top plan view showing further components of the staging system.

FIG. 3 illustrates further components of the staging system 14 in FIG. 1, including a laser light source 68, a beam splitter 70 and a reference mirror 72. The arrangement comprising the laser light source 68, beam splitter 70, reference mirror 72 and the wall 22 are recognizable in the art as a "Michelson Interferometer". The reference mirror 72 may be used for initial rough alignment of the target frame mirror 32 relative to the wall 22.

The horizontal pivot axis 54 is shown in FIG. 3. During initial alignment of the upper portion 50 of the target frame 26, it can be assumed that the horizontal pivot axis 54 is not normal to the wall 22.

Furthermore, it can be assumed that a line normal to the target frame mirror 32 is not aligned with the horizontal pivot axis 54. Calibration of the staging system 14 in FIG. 1 involves adjusting the target frame mirror 32 so that a line normal to the target frame mirror 32 coincides with the horizontal pivot axis 54. A light beam reflecting normal to the target frame mirror 32 will coincide with or be parallel to the horizontal pivot axis 54. It will thus be possible to obtain the direction of the horizontal pivot axis 54 by first determining the direction of a light beam that is normal to the target frame mirror 32.

Figure 4:
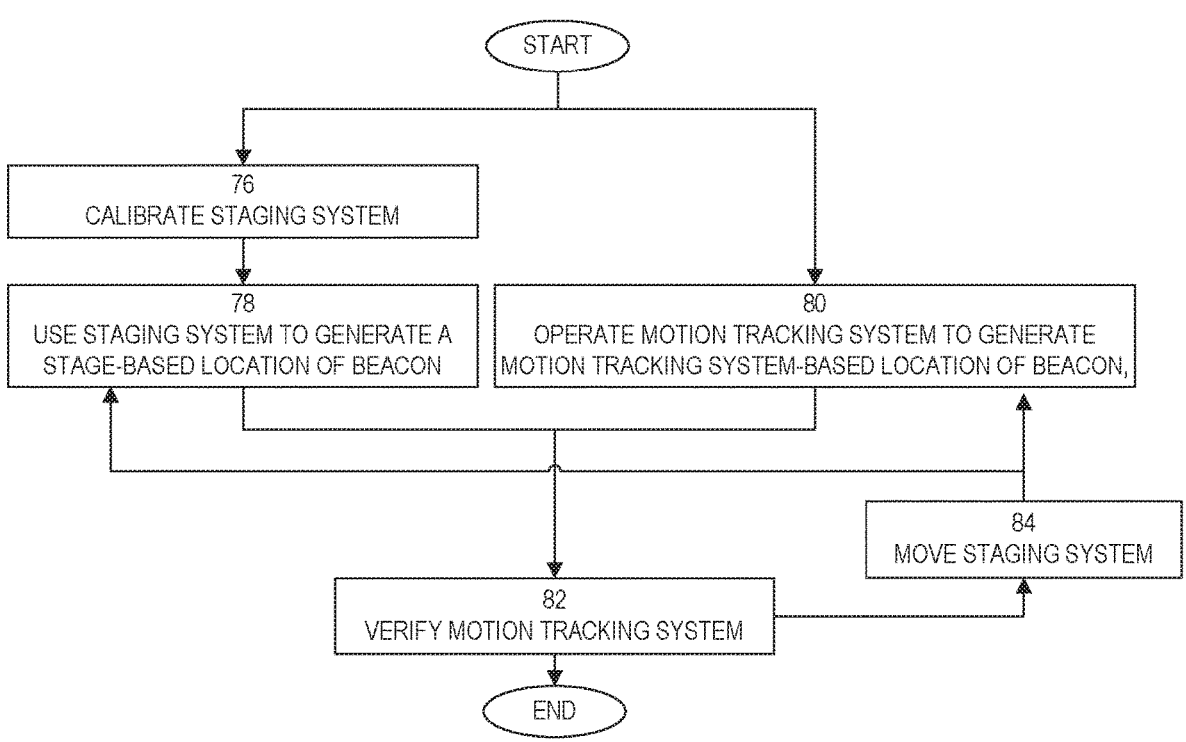
FIG. 4 is a flow chart that illustrates how the object detection system functions.

FIG. 4 illustrates a method of detecting an object using the object detection system 10 in FIG. 1. At 76, the staging system 14 is calibrated. At 78, the staging system 14 is used to generate a stage-based location of one or more of the beacons 30 in FIG. 2. At 80, the motion tracking system 12 is used to generate a motion tracking system-based location of the one or more beacons 30. At 82, the motion tracking system 12 is verified. Verification of the motion tracking system 12 generally includes a comparison of the motion tracking system-based location with the stage-based location to determine accuracy of the motion tracking system-based location. At 84, the components of the staging system 14 shown in FIG. 2 are moved from the first position 24A to the second position 24B in FIG. 1. The processes at 78, 80 and 82 are then repeated.

In use, for calibration purposes, the laser light source 68 generates a primary calibration light beam 90. The beam splitter 70 splits the primary calibration light beam 90 into a reference calibration light beam 92 and a stage calibration light beam 94. The stage calibration light beam 94 is at right angles to the primary calibration light beam 90 and the reference calibration light beam 92.

The reference calibration light beam 92 reflects at 90 degrees off the reference mirror 72 and then reflects at 90 degrees from the beam splitter 70 towards the wall 22. The location of the reference calibration light beam 92 is detected by a reference spot 96 that is created by the reference calibration light beam 92 on the wall 22. The stage calibration light beam 94 is at an angle of less than 90 degrees relative to a line normal to the target frame mirror 32 and then reflects at an angle that is less than 90 degrees from the target frame mirror 32. For example, the stage calibration light beam 94 may approach the target frame mirror 32 at an angle of 5 degrees relative to normal and reflect from the target frame mirror 32 at an angle of 5 degrees relative to normal, thus resulting in a reflected angle of 10 degrees. The stage calibration light beam 94 passes through the beam splitter 70 and progresses to the wall 22. A location of the stage calibration light beam 94 is detected by a first calibration spot 98 on the wall 22. The upper portion 50 of the target frame 26 can be adjusted so that the first calibration spot 98 moves closer to the reference spot

96. Such an adjustment results in a plane of the target frame mirror 32 being more parallel to the primary calibration light beam 90. The reference spot 96 is then not used anymore.

Figure 5:
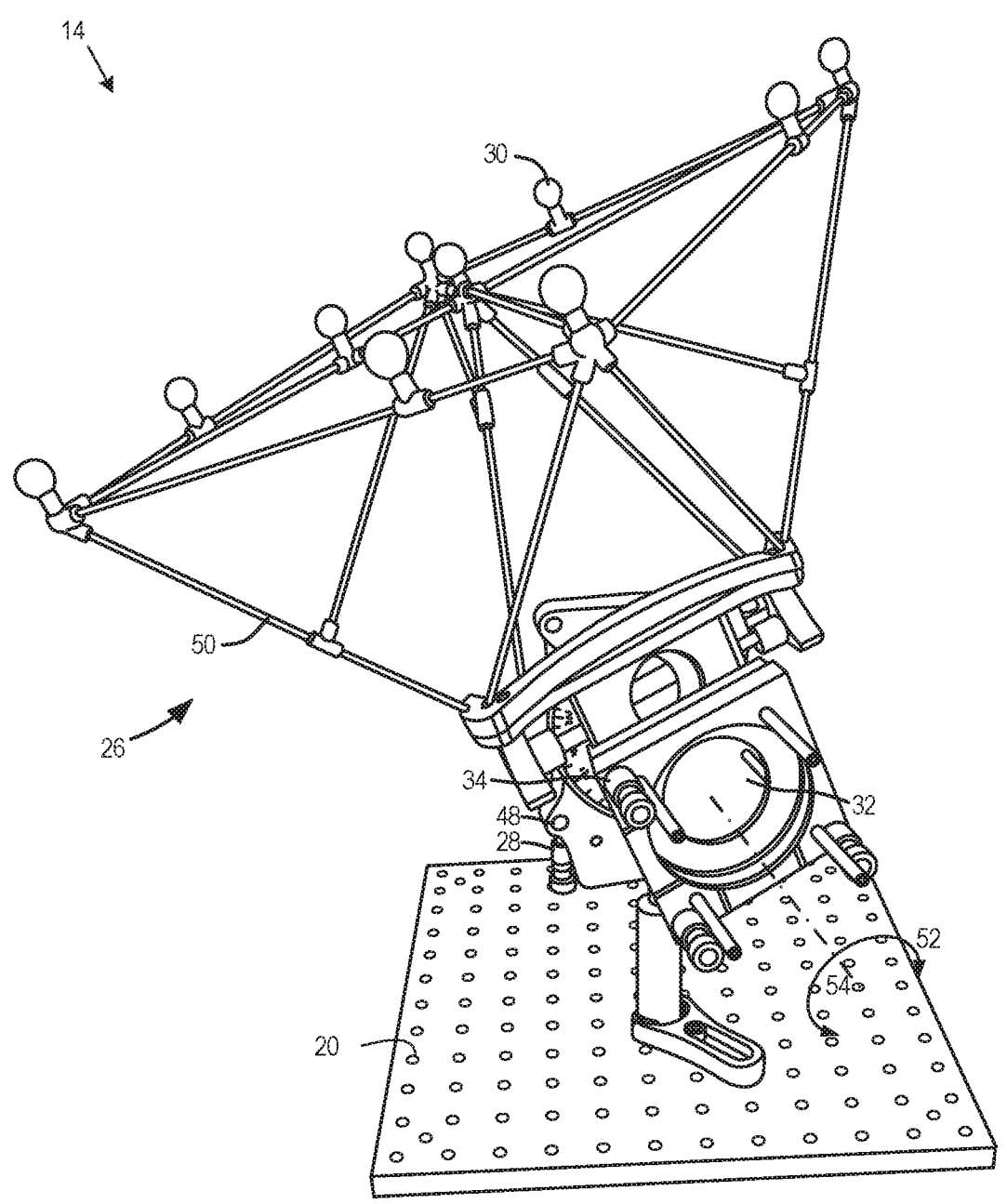
FIG. 5 is a view similar to FIG. 2 wherein an upper portion of a target frame is pivoted in one direction.
Figure 6:
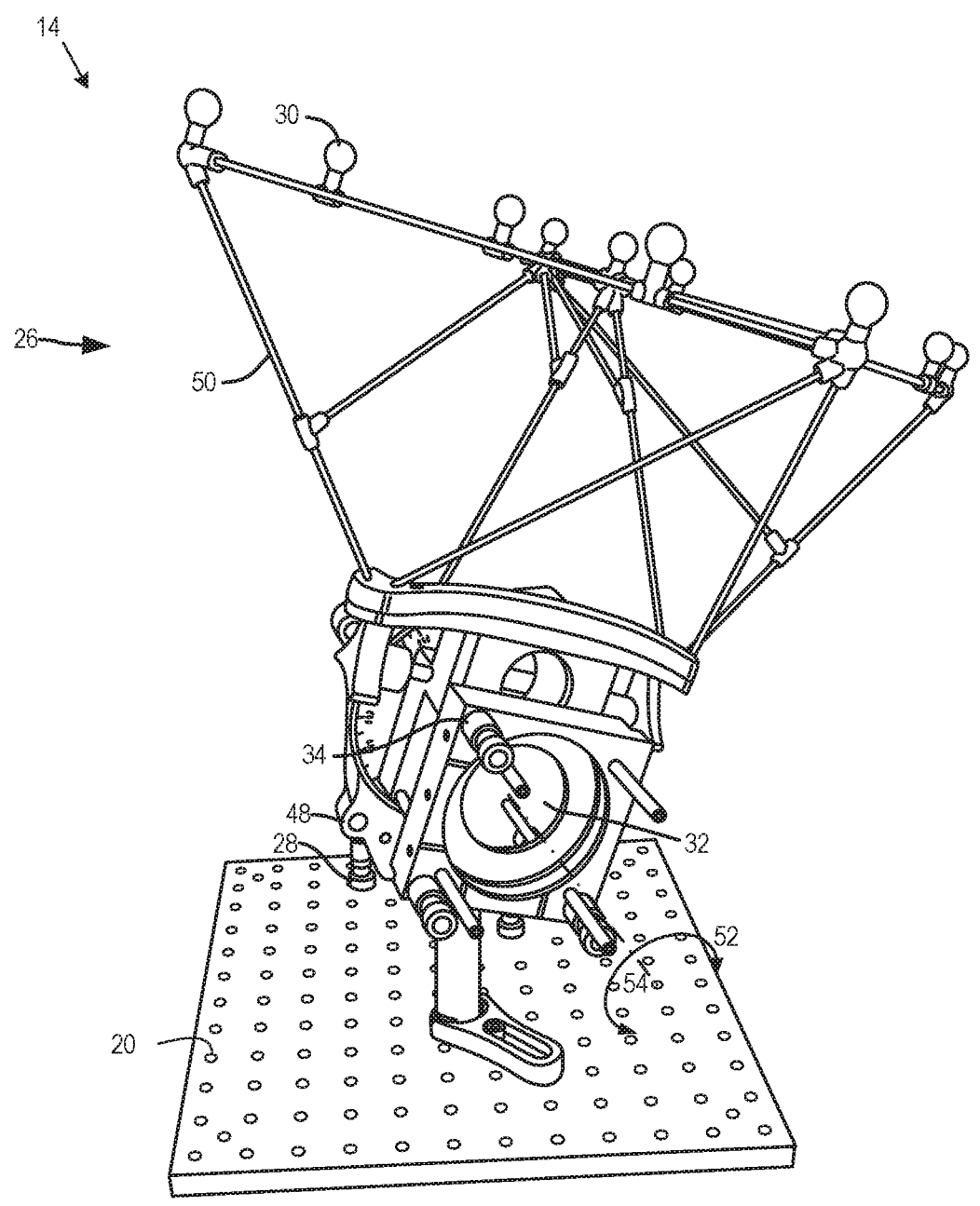
FIG. 6 is a view similar to FIG. 5 wherein the upper portion of the target frame is pivoted in an opposite direction.

As shown in FIGS. 5 and 6, the upper portion 50 of the target frame 26 is pivoted left and right about the horizontal pivot axis 54.

Figure 7A:
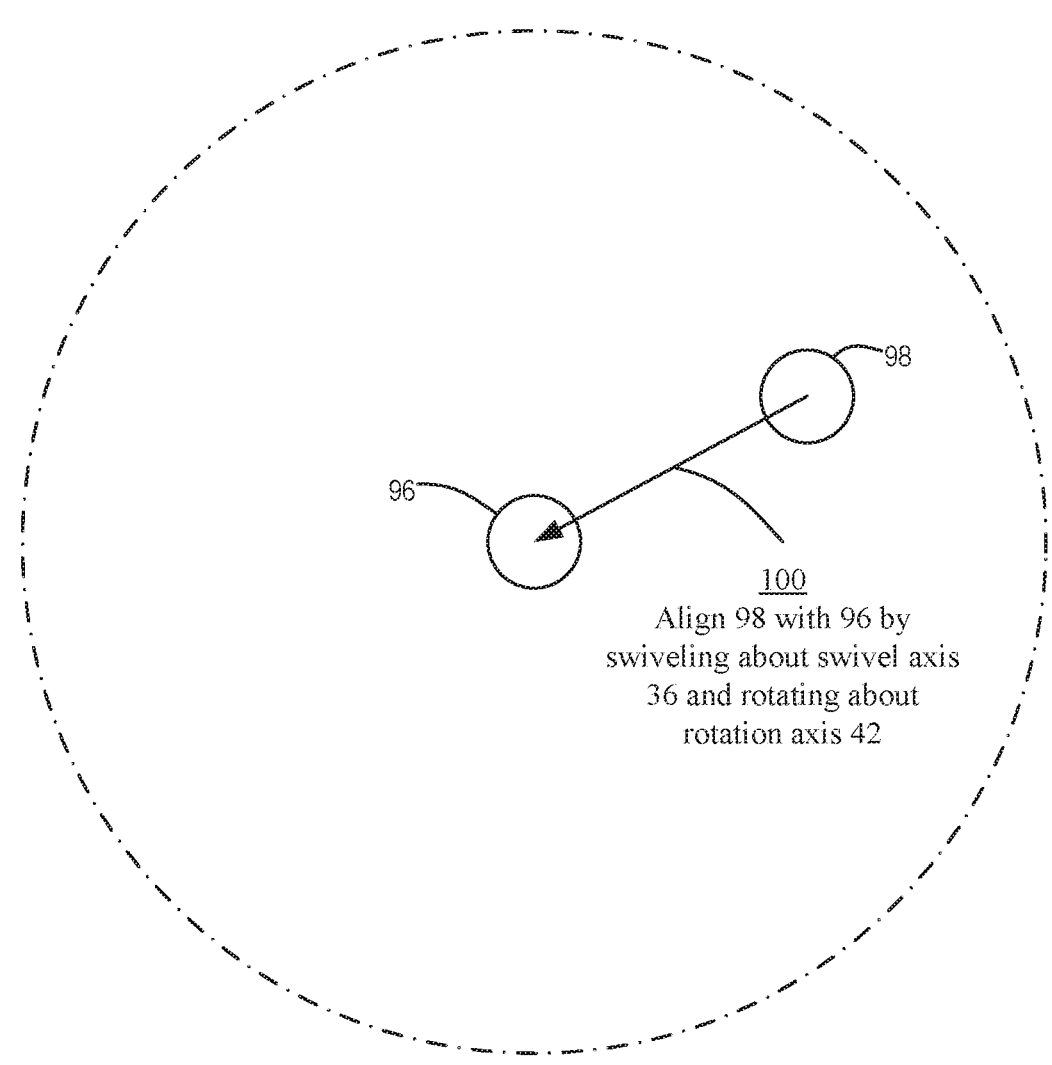
FIGS. 7A to 7F are a side view illustrating various calibration spots that are formed by a laser light beam while calibrating the staging system.
Figure 7B:
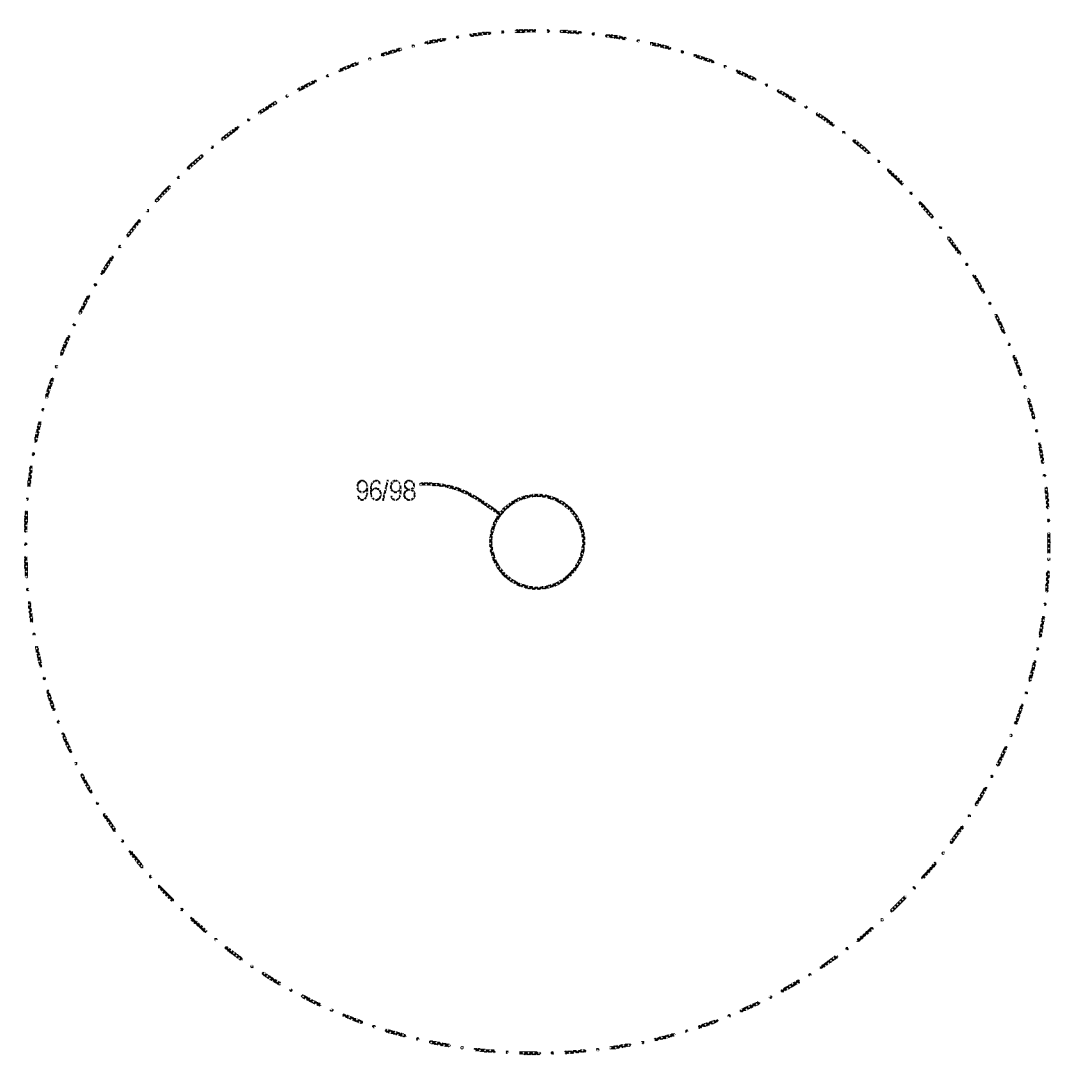

As shown in FIG. 7A, at 100, the first calibration spot 98 is first aligned with the reference spot 96. The alignment is accomplished by swivel movement about swivel axis 36 and rotation about rotation axis 42 as described above. The alignment of first calibration spot 98 with the reference spot is shown in FIG. 7B.

Figure 7C:
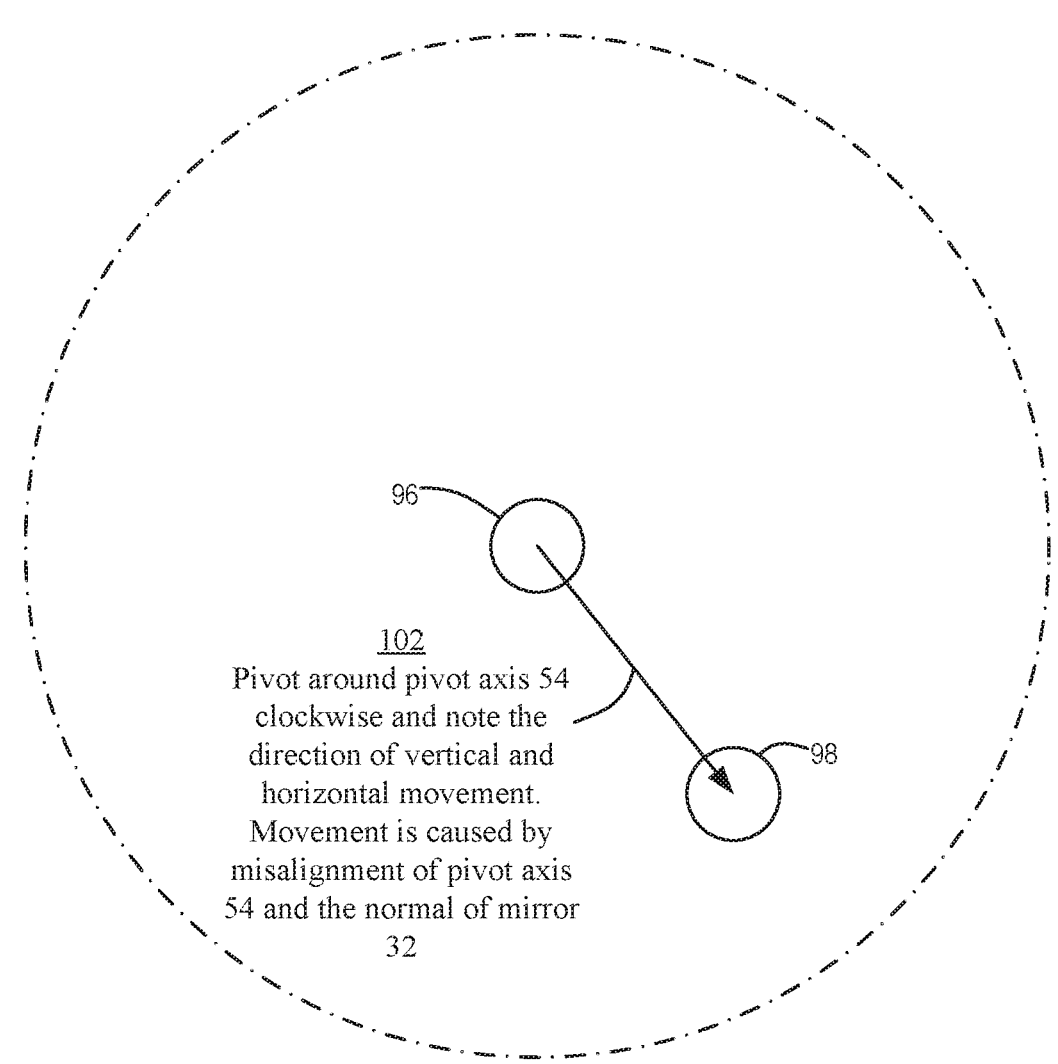
Figure 7D:
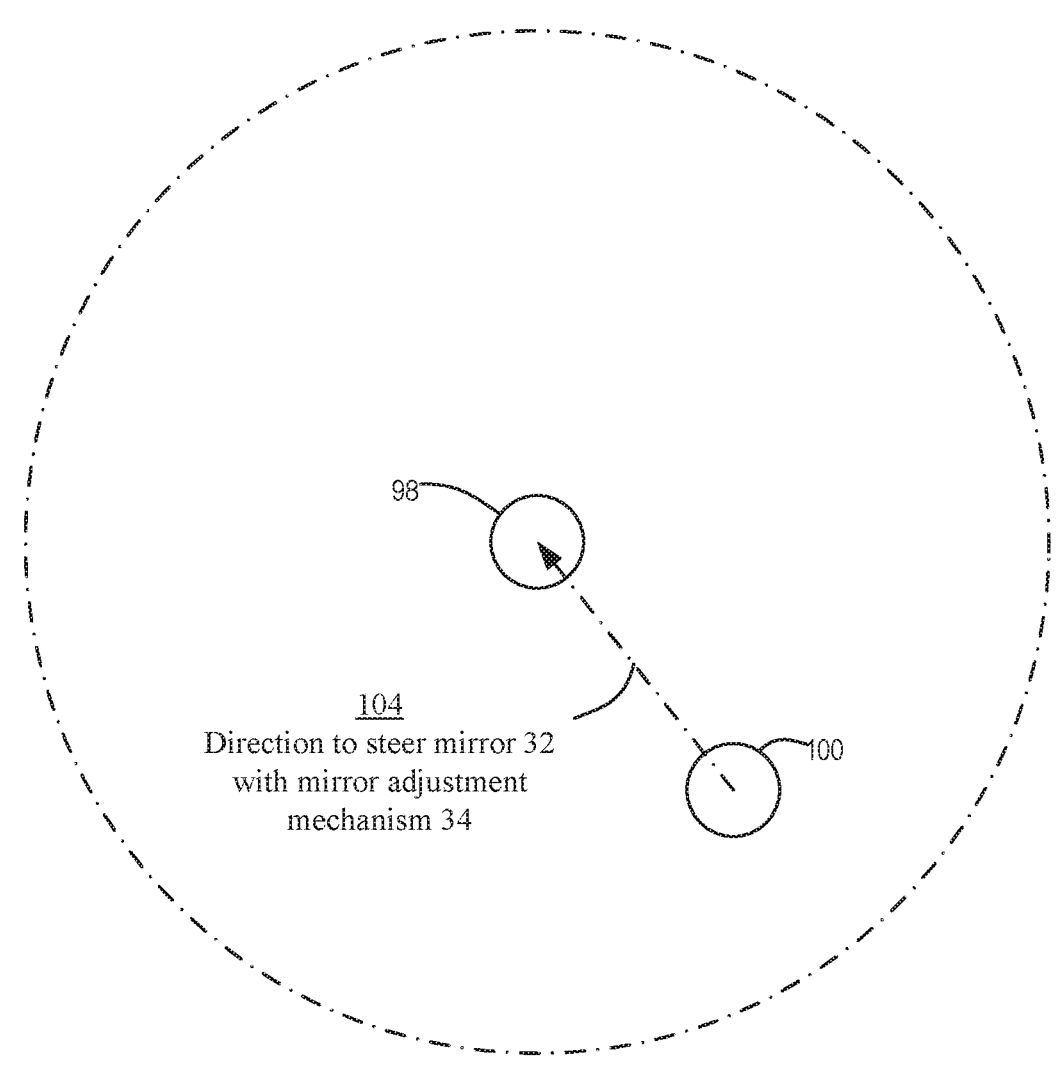
Figure 7E:
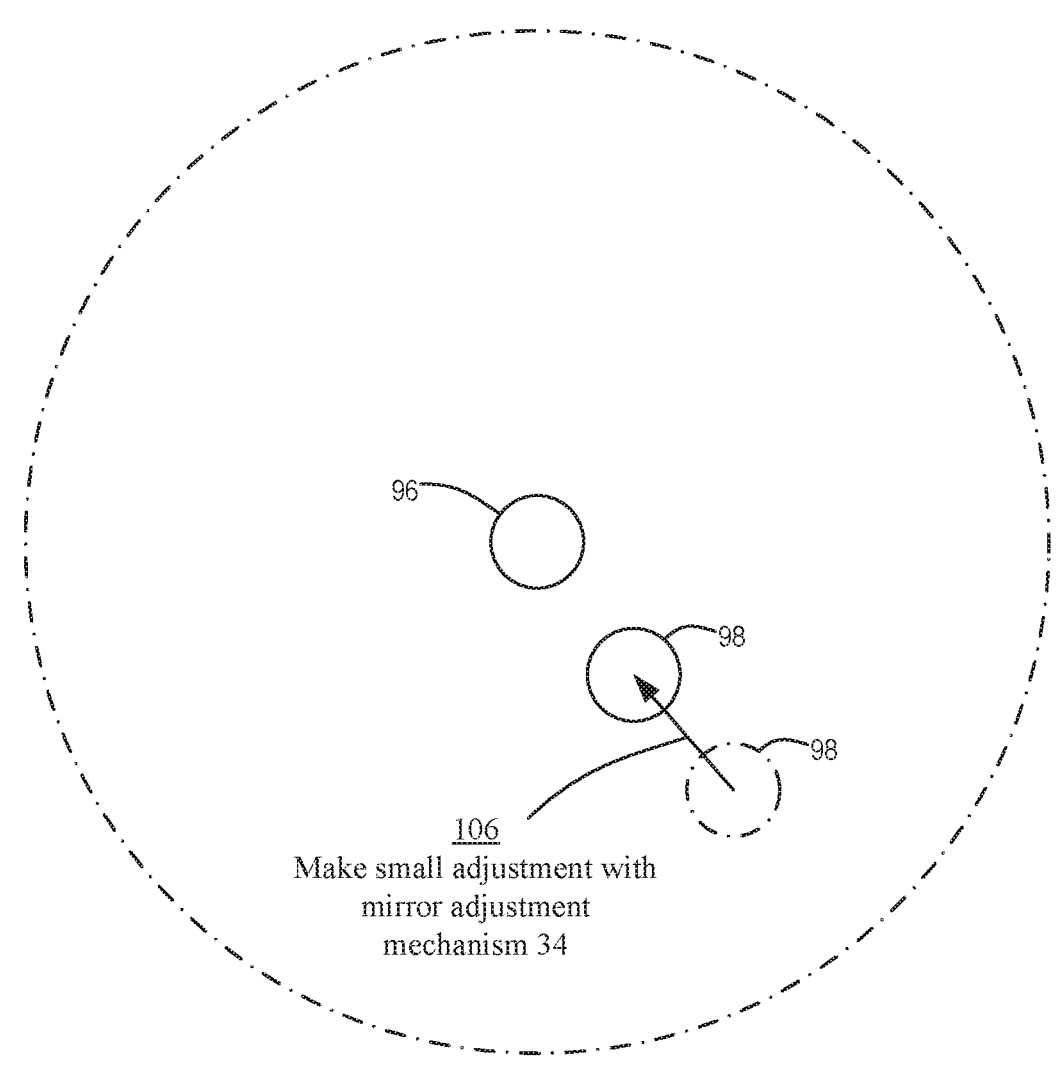

Next, as shown in FIG. 7C, at 102, pivoting about the pivot axis 54 is carried out in a clockwise direction and the direction of vertical and horizontal movement of the first calibration spot 98 is noted. Such movement is caused by misalignment of the pivot axis 54 and an axis normal of mirror 32. By noting direction at 102 in FIG. 7C, the direction to steer mirror 32 with mirror adjustment mechanism 34 can be determined as represented at 104 in FIG. 7D. As shown in FIG. 7E, at 106, a small adjustment of the mirror 32 is made with the mirror adjustment mechanism 34.

Figure 7F:
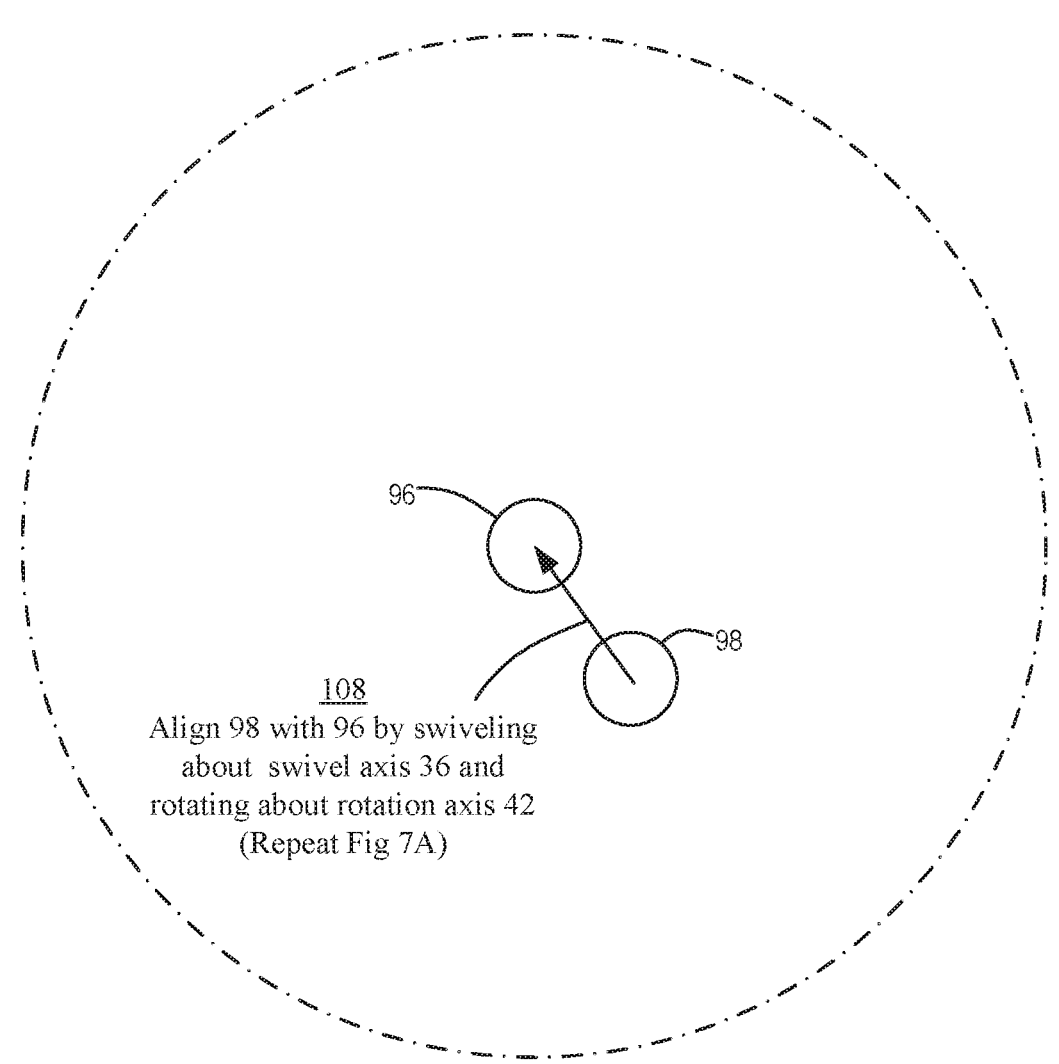

Next, as shown in FIG. 7F, at 108, the first calibration spot 98 is again aligned with the reference spot 96. The process shown in FIG. 7F is a repeat of FIG. 7A. Subsequent processes described in FIGS. 7B to 7E are repeated until clockwise movement in FIG. 7C does not produce any vertical or horizontal movement of the first calibration spot 98. It can then be concluded that normal of the mirror 32 is sufficiently aligned with or coincides with the axis pivot 54.

Figure 8:
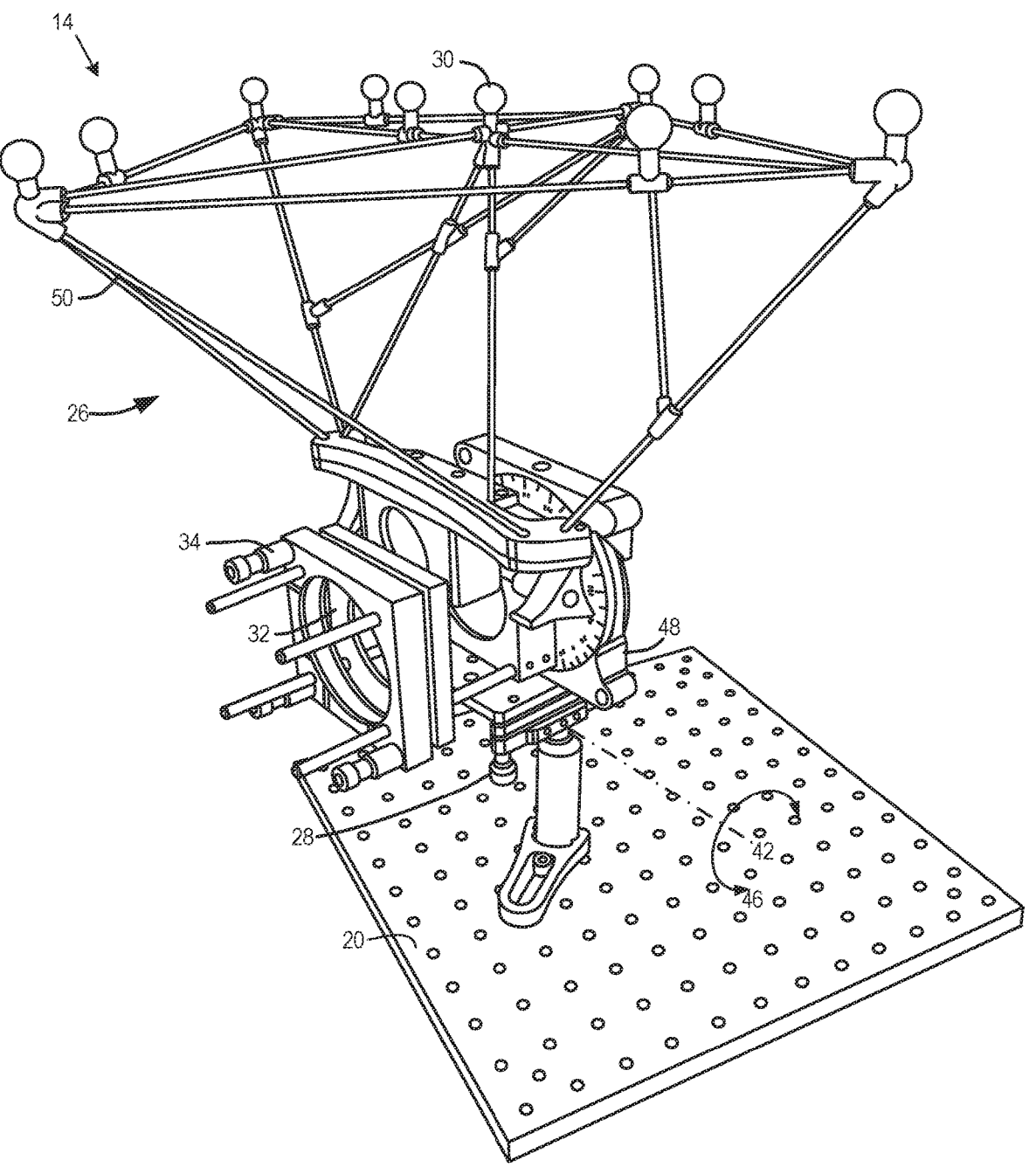
FIG. 8 is a perspective view of the components shown in FIG. 2 before the target frame is rotated about a horizontal axis.
Figure 9:
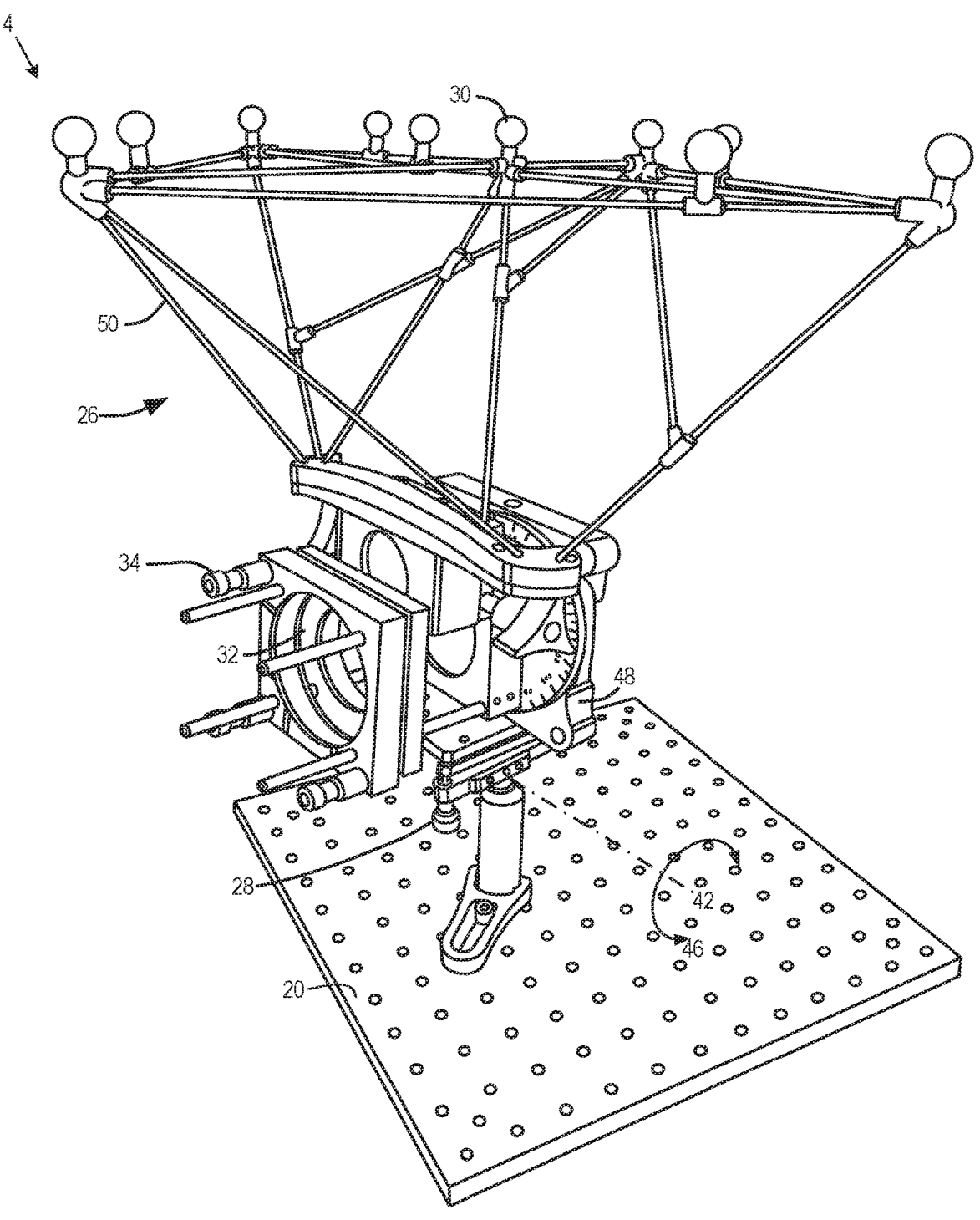
FIG. 9 is view similar to FIG. 8 after the target frame is rotated about the horizontal axis.

As shown in FIGS. 8 and 9, the target frame mirror 32 is also adjusted by using the frame adjustment mechanism 28 to rotate the target frame 26 together with the target frame mirror 32 about the horizontal axis 42.

The calibration of the staging system 14 at 76 in FIG. 4 is then completed. The staging system 14 is now used to generate a stage-based location of the beacon 30 at 78 in FIG. 4.

Figure 10:
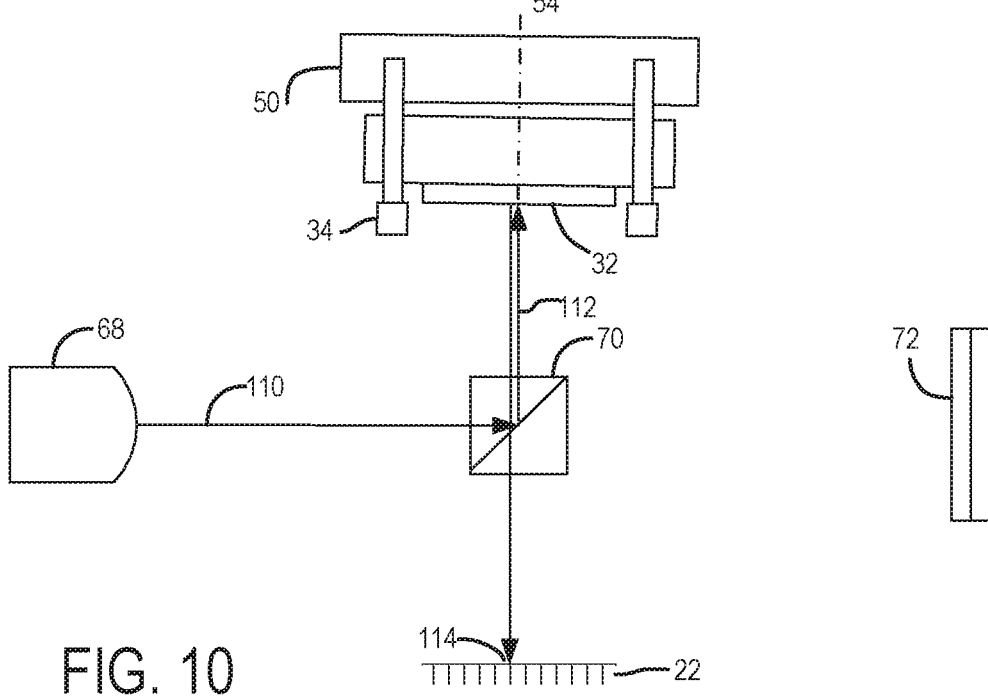
FIG. 10 is a top plan view of the components shown in FIG. 3 when they are used to verify positioning of a horizontal pivot axis.

As shown in FIG. 10, the laser light source 68 is used to generate a stage calibration light beam 110. The stage calibration light beam 110 is split by the beam splitter 70. For purposes of discussion only, one component of the stage calibration light beam 110 is used, namely the component 112 that is reflected by the beam splitter 70 towards the target frame mirror 32. The component 112 of the stage calibration light beam 110 is reflected by the target frame mirror 32 and forms a positioning spot 114 on the wall 22. The positioning spot 114 is at the same location as the fourth calibration spot 104 in FIG. 7. The positioning spot 114 also indicates the location of the horizontal pivot axis 54.

Referring to FIG. 2, the beacons 30 are in positions relative to the horizontal pivot axis 54 that are known due to the mechanical specifications according to which the staging system 14 is manufactured. Furthermore, a scale 116 provides a visual readout of the degree to which the upper portion 50 of the target frame 26 is pivoted relative to the base portion 48 of the target frame 26. The locations of the beacons 30 can thus be calculated once the location of the horizontal pivot axis 54 and the angular readout from the scale 116 are known. In practice, an operator enters the angular measurement from the scale 116 into the stage location algorithm 23 and the stage location algorithm 23 calculates the locations of the beacons 30 when the mobile platform 20 is located in the first position 24A. An output of the stage location algorithm 23 provides a stage-based location of each one of the beacons 30 in FIG. 2.

Figure 11:
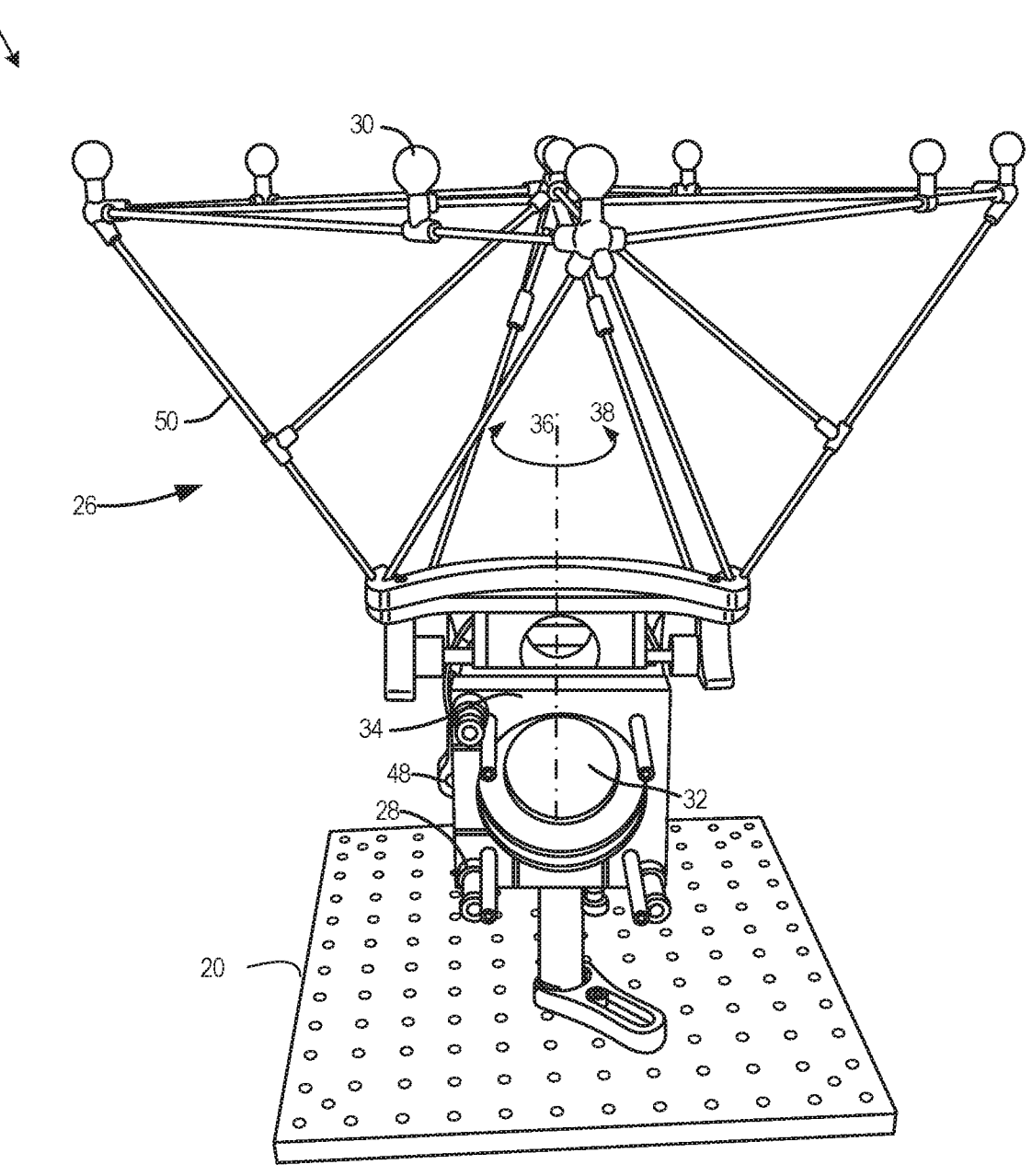
FIG. 11 is a view similar to FIG. 2 illustrating swiveling of the target frame about a vertical swivel axis.

With the mobile platform 20 in a stationary location, various adjustments can be made to the upper portion 50 of the target frame 26. For example, the upper portion 50 of the target frame 26 can be pivoted as shown in FIG. 5 and the locations of beacons 30 can again be calculated. Similarly, the upper portion 50 of the target frame 26 can be pivoted and be rotated as shown in FIGS. 5, 6, 8 and 9 and the locations of the beacons can again be calculated. As shown FIG. 11, the target frame 6 can also be swiveled about the vertical swivel axis 36 and the locations of the beacons 30 can again be calculated. A dedicated scale (not shown) is used to provide a readout of the angle to which the target frame 26 swivels in FIG. 11.

At 80 in FIG. 4, the motion tracking system 12 in FIG. 1 determines the locations of the beacons 30 independently of the staging system 14. The cameras 16 capture the locations of the beacons 30 each time that the staging system 14 is used to calculate the locations of the beacons 30 at 78 as described above. The motion tracking system positioning algorithm 18 in FIG. 1 calculates the locations of the beacons 30 based on data that the motion tracking system positioning algorithm 18 receives from the cameras 16. An output of the motion tracking system positioning algorithm 18 represents a motion tracking system-based location of each beacon 30 relative to the cameras 16 of the motion tracking system 12.

At 82 in FIG. 4, an operator verifies the motion tracking system 12. The operator compares the motion tracking system-based locations with the stage-based locations to determine accuracy of the motion tracking system-based locations. The data is compared when the staging system 14 is in a configuration shown in FIG. 2 and then repeated when the staging system 14 is in different configurations, for example in the configurations shown in FIGS. 5, 6, 8, 9 and 11.

Figure 12:
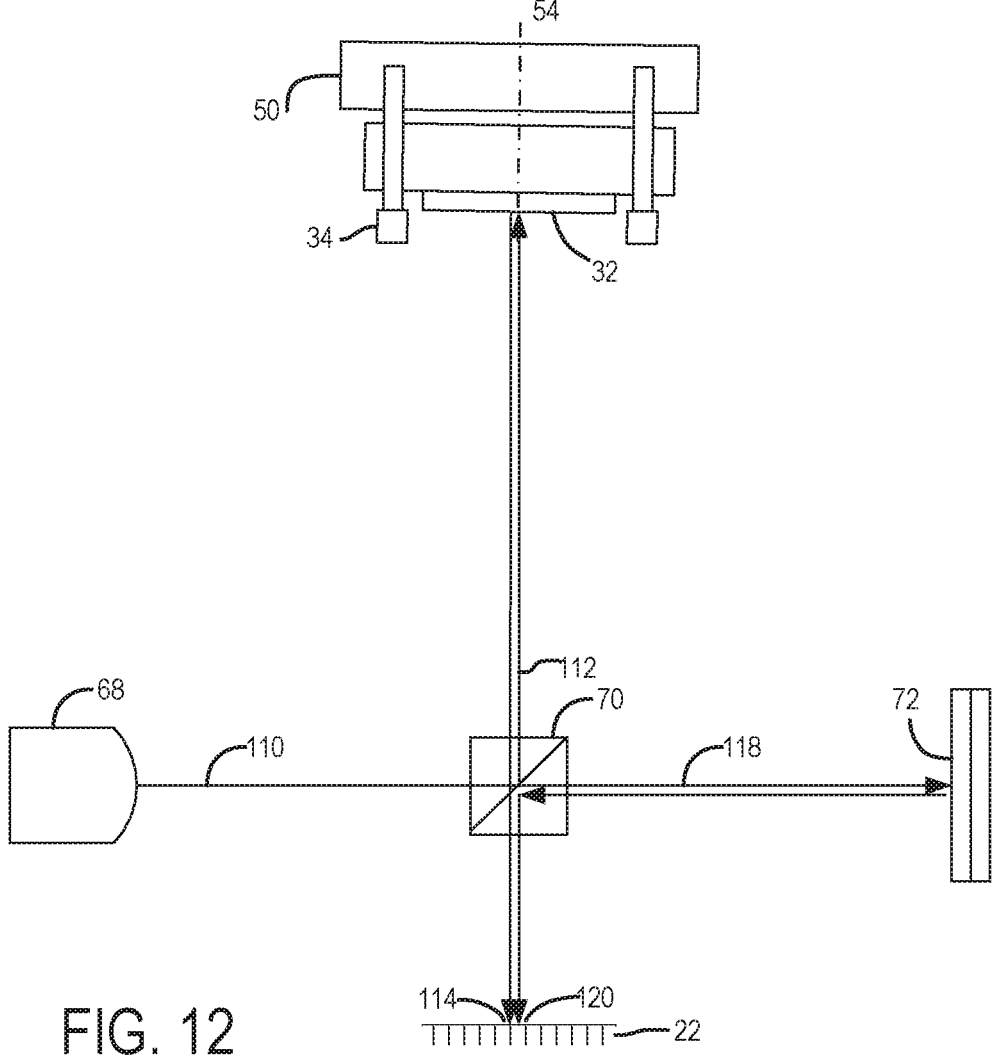
FIG. 12 is a view similar to FIG. 3 after the target frame is moved further away from the wall.

At 84 in FIG. 4, the operator moves the staging system 14. In particular, the operator moves the mobile platform 20 from the first position 24A to the second position 24B in FIG. 1. After the operator has moved the mobile platform 20, the operator again positions the mobile platform 20 so that the positioning spot 114 in FIG. 10 is at the same location that it was before the operator had moved the mobile platform 20. The operator thereby knows that the horizontal pivot axis 54 remains in the same position. FIG. 12 shows the upper portion 50 of the target frame 26 that has been moved together with the target frame mirror 32 to the second position 24B by an operator. The beam splitter 70 provides a reference beam 118 that reflects from the reference mirror 72 and from the beam splitter 70 and forms a reference spot 120 on the wall 22. The operator aligns the positioning spot 114 with the reference spot 120. The horizontal pivot axis 54 thus remains in the same position when comparing FIG. 12 with FIG. 10. Further adjustments as illustrated in FIGS. 8 and 9 are again made, wherein the frame adjustment mechanism 28 is used to align the positioning spot 114 with the reference spot 120. However, any adjustments using the mirror orientation adjustment mechanism 34 are not made at this stage.

Referring again to FIG. 4, the processes at 78, 80 and 82 are then again repeated to verify the accuracy of the motion tracking system 12.

A Michelson Interferometer is used because of its accuracy and ease of use. It may be possible to calibrate the target frame mirror 32 using a different optical system that uses laser light or non-laser light.

The detectors of the motion tracking system 12 are represented as cameras 16. It may be possible to use other detectors such as infra-red detectors or radar detectors. Furthermore, the cameras 16 are shown in stationary positions around the staging area, although it may be possible to locate one or more cameras or other detectors on the target frame 26 instead.

Figure 13:
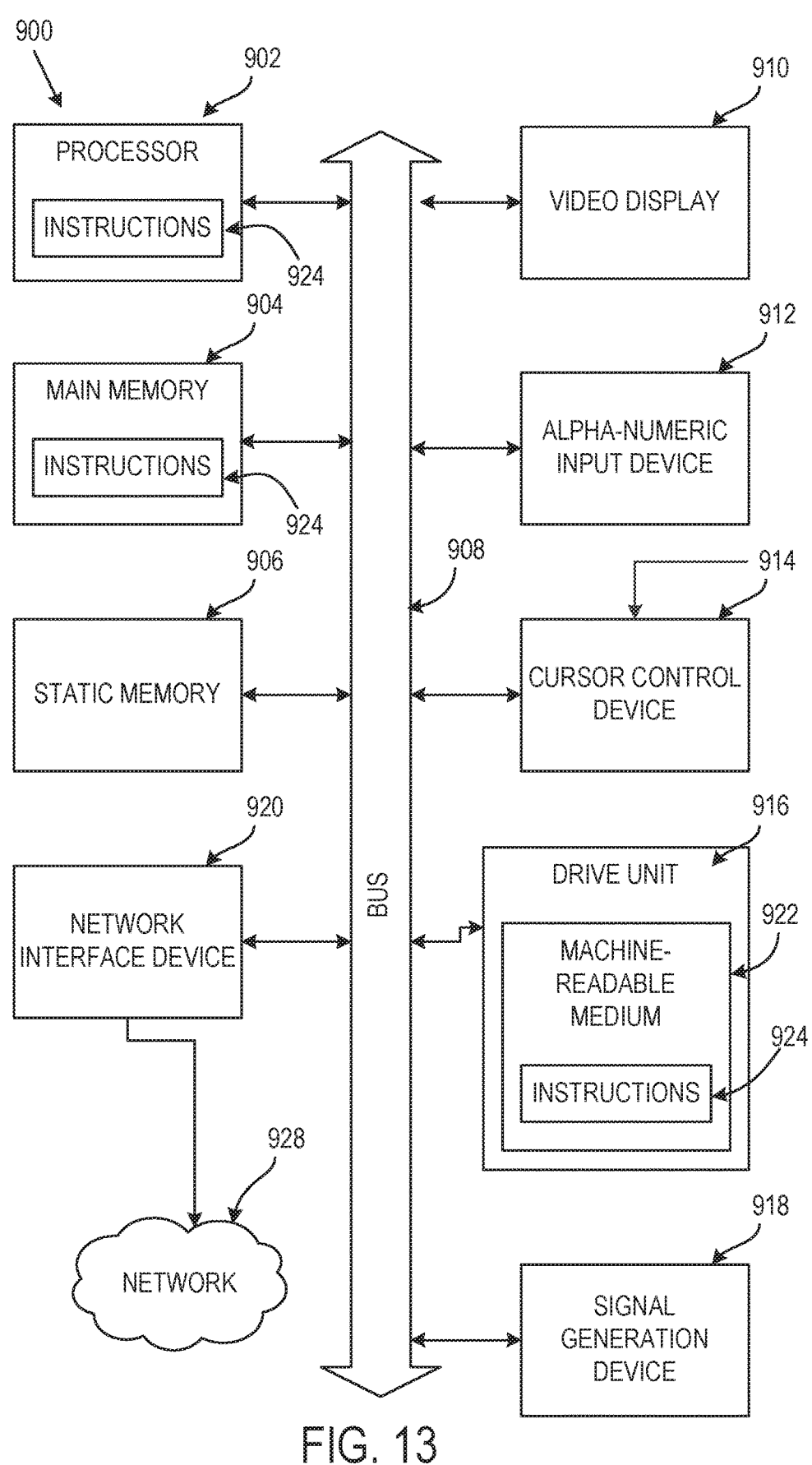
FIG. 13 is a block diagram of a machine in the form of a computer that can find application in the present invention system, in accordance with one embodiment of the invention

FIG. 13 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of detecting an object comprising:
(i) calibrating a staging system, including:
  positioning a mobile platform of the staging system in a first stationary position within a staging area;
  generating a stage calibration light beam;
  transmitting the stage calibration light beam from a target frame of the staging system mounted to the stationary platform;
  reflecting the stage calibration light beam from a target frame mirror;
  pivoting the target frame about a pivot axis between a first pivot angle and a second pivot angle relative to the mobile platform;
  detecting first and second locations of the stage calibration light beam after the stage calibration light beam is reflected from the target frame mirror when the target frame is in the first pivot angle and in the second pivot angle respectively;
  determining, based on the first and second locations, a value representing an orientation of the target frame mirror relative to the pivot axis; and
  adjusting, based on the determination of the value representing the orientation of the target frame mirror, the orientation of the target frame mirror relative to the target frame so that the target frame mirror is more normal to the pivot axis.

2. The method of claim 1, wherein the stage calibration light beam is a laser beam.

3. The method of claim 1, further comprising:
generating a primary calibration light beam;
splitting the primary calibration light beam into a reference calibration light beam and the stage calibration light beam;
detecting a location of the reference calibration light beam and a location of the stage calibration light beam; and
adjusting an orientation of the target frame so that the location of the stage calibration light beam coincides with the location of the reference calibration light beam.

4. The method of claim 3, wherein a beam splitter splits the primary calibration light beam.

5. The method of claim 4, wherein the beam splitter splits the primary calibration light beam based on intensity.

6. The method of claim 1, further comprising:
(ii) using the staging system to generate a stage-based location of a beacon.

7. The method of claim 6, further comprising:
generating a stage positioning light beam;
reflecting the stage positioning light beam from the target frame mirror;
detecting a location of the stage positioning light beam after the stage positioning light beam is reflected from the target frame mirror; and
determining a stage-based location of the beacon on the target frame based on the stage positioning light beam.

8. The method of claim 6, wherein using the staging system to generate a stage-based location of a beacon, includes:

moving the staging system and positioning the mobile platform of the staging system in a second stationary position within the staging area;
detecting a location of the stage positioning light beam after moving the staging system and the stage positioning light beam is reflected from the target frame mirror; and
determining a stage-based location of the beacon on the target frame based on the stage positioning light beam after moving the staging system.

9. The method of claim 8, wherein the staging system is moved in a direction of the stage positioning light beam.

10. The method of claim 9, further comprising:
adjusting an orientation of the target frame relative to the mobile platform after moving the mobile platform to adjust a location of the stage positioning light beam.

11. The method of claim 6, wherein the stage positioning light beam is a laser beam.

12. The method of claim 6, further comprising:
(iii) operating a motion tracking system to generate a motion tracking system-based location of the beacon, including:
  detecting, with at least one detector, the beacon and a value of the beacon relative to the detector; and
  determining, with a motion tracking system positioning algorithm a motion tracking system-based location of the beacon relative to the motion tracking system.

13. The method of claim 12, wherein operating the motion tracking system to generate a motion tracking system-based location of the beacon includes:
swiveling the target frame about a vertical swivel axis relative to the mobile platform;
detecting, with at least one detector, the beacon and a value of the beacon relative to the detector after swiveling the target frame relative to the mobile platform; and
determining, with a motion tracking system, positioning algorithm a motion tracking system-based location of the beacon relative to the motion tracking system-based on the value of the beacon relative to the detector.

14. The method of claim 12, further comprising:
(iv) verifying the motion tracking system, including:
comparing the motion tracking system-based location with the stage-based location to determine accuracy of the motion tracking system-based location.

15. A method of detecting an object comprising:
(i) calibrating a staging system, including:
  generating a stage calibration light beam;
  reflecting the stage calibration light beam from a target frame mirror;
  pivoting a target frame about a pivot axis between a first pivot angle and a second pivot angle relative to a mobile platform;
  detecting first and second locations of the stage calibration light beam after the stage calibration light beam is reflected from the target frame mirror when the target frame is in the first pivot angle and in the second pivot angle respectively;
  determining, based on the first and second locations, a value representing an orientation of the target frame mirror relative to the pivot axis; and
  adjusting, based on the determination of the value representing the orientation of the target frame mirror, the orientation of the target frame mirror relative to the target frame so that the target frame mirror is more normal to the pivot axis;

(ii) using the staging system to generate a stage-based location of a beacon, including:

generating a stage positioning light beam;

reflecting the stage positioning light beam from the target frame mirror;

detecting a location of the stage positioning light beam after the stage positioning light beam is reflected from the target frame mirror; and determining a stage-based location of the beacon on the target frame based on the stage positioning light beam;

(iii) operating a motion tracking system to generate a motion tracking system-based location of the beacon, including:

detecting, with at least one detector, the beacon and a value of the beacon relative to the detector;

determining, with a motion tracking system, positioning algorithm a motion tracking system-based location of the beacon relative to the motion tracking system-based on the value of the beacon relative to the detector; and (iv) verifying the motion tracking system, including:

comparing the motion tracking system-based location with the stage-based location to determine accuracy of the motion tracking system-based location.

16. An object detection system comprising:

(i) a staging system that includes:

a mobile platform;

a target frame mounted to the mobile platform for pivotal movement about a pivot axis between a first pivot angle and a second pivot angle;

a beacon on the target frame;

a target frame mirror attached to the target frame;

at least one light source generating a stage calibration light beam, for reflection from the target frame mirror, first and second locations of the stage calibration light beam after the stage calibration light beam is reflected from the target frame mirror being detectable when the target frame is in the first pivot angle and in the second pivot angle respectively, based on the first and second locations, a value being calculable representing an orientation of the target frame mirror relative to the pivot axis;

a mirror orientation adjustment mechanism between the target frame mirror and the target frame to adjust, based on the determination of the value representing the orientation of the target frame mirror, the orientation of the target frame mirror so that the target frame mirror is more normal to the pivot axis, the at least one light source generating and reflecting a stage positioning light beam from the target frame mirror, a location of the stage positioning light beam after the stage positioning light beam is reflected from the target frame mirror being detectable; and a stage location algorithm to determine a stage-based location of the beacon on the target frame based on the stage positioning light beam; and (ii) a motion tracking system that includes:

at least one detector positioned to detect the beacon and a value of the beacon relative to the detector; and a motion tracking system positioning algorithm for receiving the value of the beacon relative to the detector as an input, the motion tracking system positioning algorithm to determine a motion tracking system-based location of the beacon relative to the motion tracking system as an output from the motion tracking system positioning algorithm for comparing the motion tracking system-based location with the stage-based location to determine accuracy of the motion tracking system-based location.

17. The method of claim 16, wherein the mobile stage includes:

a frame adjustment mechanism between the mobile platform and the target frame to adjust an orientation of the target frame relative to the mobile platform.

* * * * *